United States Patent
Lee et al.

(10) Patent No.: US 9,913,178 B2
(45) Date of Patent: Mar. 6, 2018

(54) METHOD FOR PERFORMING CHANNEL SWITCH IN NETWORK CONVERGING PLURALITY OF COMMUNICATION SYSTEMS AND APPARATUS FOR SAME

(71) Applicant: LG Electronics Inc., Seoul (KR)

(72) Inventors: Eunjong Lee, Seoul (KR); Hyeyoung Choi, Seoul (KR); Heejeong Cho, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 14/771,361

(22) PCT Filed: Mar. 4, 2014

(86) PCT No.: PCT/KR2014/001771
§ 371 (c)(1),
(2) Date: Aug. 28, 2015

(87) PCT Pub. No.: WO2014/142459
PCT Pub. Date: Sep. 18, 2014

(65) Prior Publication Data
US 2016/0007247 A1    Jan. 7, 2016

Related U.S. Application Data

(60) Provisional application No. 61/775,664, filed on Mar. 10, 2013.

(51) Int. Cl.
*H04W 4/00* (2009.01)
*H04J 3/16* (2006.01)
(Continued)

(52) U.S. Cl.
CPC ... *H04W 36/0066* (2013.01); *H04W 36/0072* (2013.01); *H04W 84/12* (2013.01); *H04W 88/08* (2013.01)

(58) Field of Classification Search
None
See application file for complete search history.

(56) References Cited

U.S. PATENT DOCUMENTS 6,259,918 B1 *   7/2001   Labonte ............... H04B 7/0408
                                                                455/436
2004/0008645 A1 *   1/2004   Janevski .......... H04W 36/0033
                                                                370/331
(Continued)

FOREIGN PATENT DOCUMENTS

KR    1020100021478        2/2010
WO       2003075513 A1     9/2003
(Continued)

OTHER PUBLICATIONS

S. Duvvuri et al.: "Channel Switch Time Negotiation", IEEE P802.11, IEEE 802.11//1089r1, Sep. 8, 2008, XP017680511.

Primary Examiner — Lonnie Sweet
(74) Attorney, Agent, or Firm — Dentons US LLP

(57) ABSTRACT

A method for performing a channel switch by user equipment of a first communication system in a network converging a plurality of communication systems, may comprise receiving, a channel switch command message including a switch time and a new channel number, from a base station of the first communication system; transmitting a channel switch response message indicating acceptance of a channel switch when the new channel number is supported by the user equipment, to the base station of the first communication system in a response to the channel switch command message; receiving a channel switch notification message, which notifies of a channel switch, from a base station of the second communication system; and receiving data from the base station of the second communication system via a channel corresponding to the new channel number based on
(Continued)

the switch time and the new channel number according to
the channel switch notification message.

5 Claims, 21 Drawing Sheets

(51) Int. Cl.
  *H04W 36/00*      (2009.01)
  *H04W 84/12*      (2009.01)
  *H04W 88/08*      (2009.01)

(56)  References Cited

U.S. PATENT DOCUMENTS

| | | | |
|---|---|---|---|
| 2007/0147386 A1 | 6/2007 | Choi et al. | |
| 2008/0102832 A1* | 5/2008 | Sengupta | H04W 88/06 455/435.2 |
| 2009/0029706 A1* | 1/2009 | Prakash | H04L 1/0061 455/436 |
| 2010/0093354 A1* | 4/2010 | Agashe | H04W 36/04 455/436 |
| 2012/0094681 A1* | 4/2012 | Freda | H04W 72/02 455/452.1 |
| 2012/0178448 A1 | 7/2012 | Yuk et al. | |
| 2013/0229976 A1* | 9/2013 | Srinivasan | H04W 36/18 370/315 |

FOREIGN PATENT DOCUMENTS

| | | |
|---|---|---|
| WO | 2012118740 | 9/2012 |
| WO | 2012170350 A1 | 12/2012 |

* cited by examiner

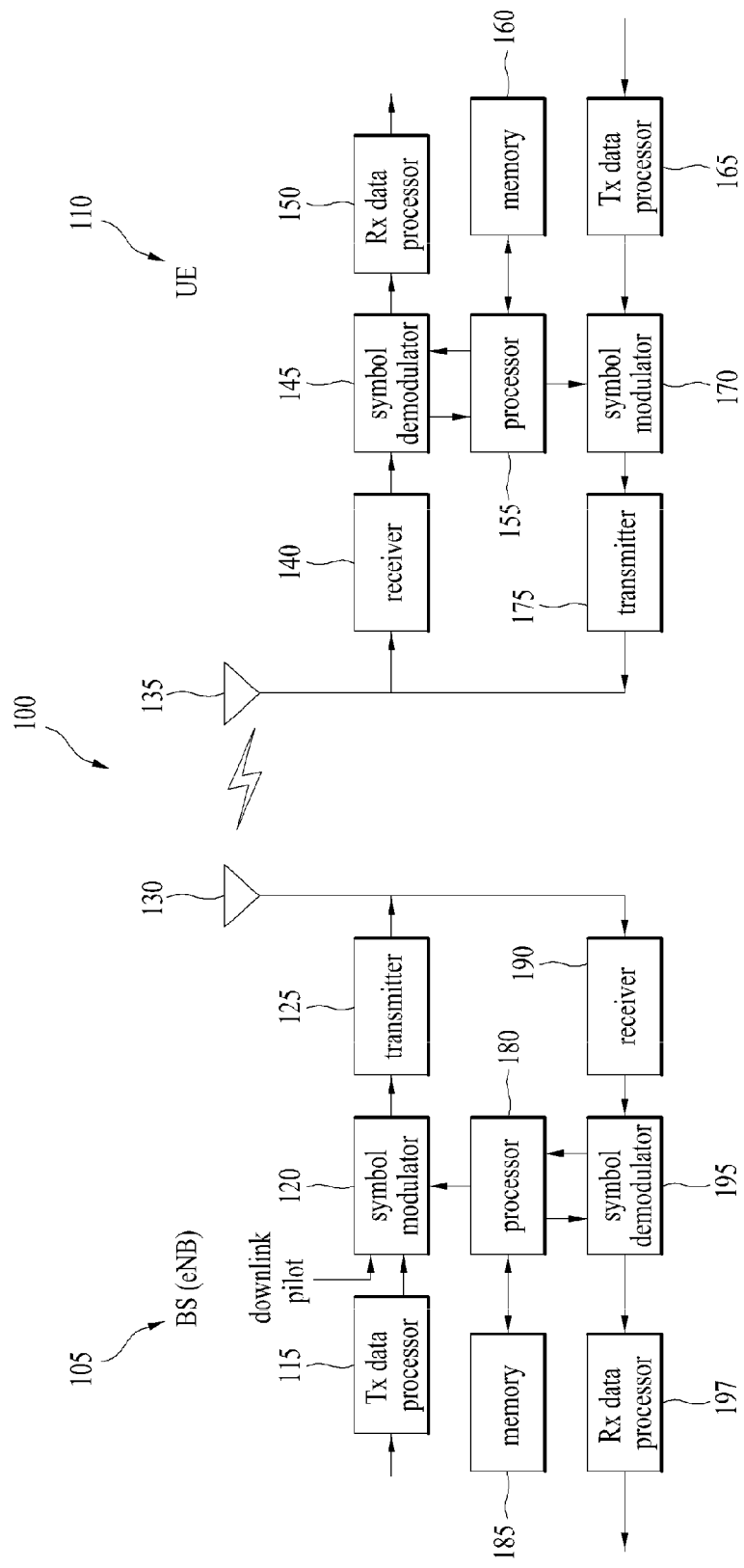

FIG. 7

| Element ID | Length | Information |
|---|---|---|
| 1 | 1 | variable |

Octets:

FIG. 8

One (first channel, number of channels) turple for each subband

| Element ID | Length | First Channel Number | Number of Channel |
|---|---|---|---|
| 1 | 1 | 1 | 1 |

Octets:

FIG. 9A

| Operating Class | Channel Number | Randomization Interval | Measurement Duration | Optional Subelements |
|---|---|---|---|---|
| 1 | 1 | 2 | 2 | variable |

Octets :

FIG. 9B

| Reporting Condition | Channel Load Reference Value |
|---|---|
| 1 | 1 |

Octets :

FIG. 10A

| Operating Class | Channel Number | Actual Measurement Start Time | Measurement Durating | Channel Load | Optional Subelements |
|---|---|---|---|---|---|
| 1 | 1 | 8 | 2 | 1 | variable |

Octets :

FIG. 10B

| Element ID | Length | Operating Class | Channel List |
|---|---|---|---|
| 1 | 1 | 1 | variable |

Octets :

FIG. 11

| Element ID | Length | Country String | First Channel Number / Operating Extension Identifier | Number of Channels / Operating Class | Maximum Transmit Power level / Coverage Class | Pad (if needed) |
|---|---|---|---|---|---|---|
| 1 | 1 | 3 | 1 | 1 | 1 | 0 or 1 |

These three fields are repeated, as determined by the Length field

Octets :

FIG. 12

| Element ID | Length | Channel Switch Mode | New Channel Number | Channel Switch Count |
|---|---|---|---|---|
| 1 | 1 | 1 | 1 | 1 |

Octets :

FIG. 13A

| Element ID | Length | Channel Switch Mode | New Operating Class | New Channel Number | Channel Switch Count |
|---|---|---|---|---|---|
| 1 | 1 | 1 | 1 | 1 | 1 |

Octets :

FIG. 13B

| Element ID | Length | Current Operating Class | Operating Classes |
|---|---|---|---|
| 1 | 1 | 1 | Length-1 |

Octets :

FIG. 14

| Element ID | Length | Switch Time | Switch Timeout |
|---|---|---|---|

Octets :  1  1  2  2

FIG. 15A

| Category | Spectrum Management Action | Channel Switch Announcement element | Secondary Channel Offset element | Mesh Channel Switch Parameters element |
|---|---|---|---|---|
| 1 | 1 | 5 | 3 | 6 |

Octets :

FIG. 15B

| Category | Public Action | Channel Switch Mode | New Operaing Class | New Channel Number | Channel Switch Count | Mesh Channel Switch Parameters element |
|---|---|---|---|---|---|---|
| 1 | 1 | 1 | 1 | 1 | 1 | 6 |

Octets :

FIG. 19A

| FC info Request | AP SSID/BSSID | Request information | | | | | FC information reporting configuration | |
|---|---|---|---|---|---|---|---|---|
| | | Supported freq. ch list | Current freq. ch # | ANPI | RSPI | Load | Reporting (periodic or event) | Reporting interval or trigger conditions(index, threshold) |
| x octet | y octet | 1 bit | 1 bit | 1 bit | 1 bit | 1 bit | 1 bit | Var. |

FIG. 19B

| FC info Request | AP SSID/BSSID | FC information | | | | |
|---|---|---|---|---|---|---|
| | | Supported freq. ch list | Current freq. ch # | ANPI | RSPI | Load |
| x octet | y octet | Var. | 1 octet | 1 octet | 1 octet | Z octet |

METHOD FOR PERFORMING CHANNEL SWITCH IN NETWORK CONVERGING PLURALITY OF COMMUNICATION SYSTEMS AND APPARATUS FOR SAME

This application is a 35 USC § 371 National Stage entry of International Application No. PCT/KR2014/001771 filed on Mar. 4, 2014, and claims priority to U.S. Provisional Application No. 61/775,664 filed on Mar. 10, 2013, all of which are hereby incorporated by reference in their entireties as if fully set forth herein.

TECHNICAL FIELD

The present invention relates to a wireless communication system, and more particularly to a method and apparatus for performing channel switching in a plurality of communication system convergence networks.

BACKGROUND ART

There is a multi-RAT user equipment (UE) having capability in which the multi-RAT UE can access two or more radio access technologies (RATs). In order to access a specific RAT, connection to a specific RAT can be established on the basis of a UE request, and data transmission/reception can be achieved on the basis of the UE request.

However, although the multi-RAT UE has the capability to access two or more RATs, the multi-RAT UE cannot simultaneously access multiple RATs. In other words, although a current UE has multi-RAT capability, the UE cannot simultaneously transmit and receive data through different RATs.

The conventional multi-RAT technology need not perform interworking between a WLAN and a cellular network, such that overall system efficiency is low. However, a method for solving such low system efficiency has not yet been researched and discussed.

DISCLOSURE

Technical Problem

An object of the present invention is to provide a method for allowing a user equipment (UE) of a first communication system to perform channel switching in a plurality of communication system convergence networks.

Another object of the present invention is to provide a user equipment (UE) of a first communication system configured to perform channel switching in a plurality of communication system convergence networks.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing channel switch by a user equipment (UE) of a first communication system in a plurality of communication system convergence networks including: receiving a channel switch command message including a switch time and a new channel number from a base station (BS) of the first communication system; if the new channel number is supported by the user equipment, transmitting a channel switch response message indicating acceptance of the channel switch to the base station (BS) of the first communication system in a response to the channel switch command message; receiving a channel switch notification message indicating the channel switch from a base station (BS) from a second communication system; and receiving data from the base station (BS) of the second communication system through a channel corresponding to the new channel number based on the switch time and the new channel number according to the channel switch notification message.

The user equipment (UE) may transmit data to the base station (BS) of the second communication system through a channel corresponding to the new channel number after lapse of the switch time from a reception time of the channel switch notification message. The user equipment (UE) may transmit data to the base station (BS) of the first communication system before the switch time elapses from the reception time of the channel switch notification message. The channel switch may be determined by the base station (BS) of the second communication system. The first communication system and the second communication system may be heterogeneous communication systems. The first communication system may be a cellular communication system, and the second communication system may be a wireless LAN (WLAN) system.

In accordance with another aspect of the present invention, a method for performing channel switch by a user equipment (UE) of a first communication system in a plurality of communication system convergence networks includes: receiving, by the user equipment (UE) which communicates with a base station (BS) of a second communication system through a specific channel, a channel switch command message including a new channel number from a node of the first communication system which manages interworking between the plurality communication systems; if the new channel number is supported by user equipment, transmitting a channel switch response message indicating acceptance of the channel switch to the node of the first communication system in a response to the channel switch command message; receiving a message including an indicator instructing perform data communication with a base station (BS) of the first communication system from the node of the first communication system during a switch time corresponding to a time interval from a channel switch notification message reception time to a channel switch completion time; receiving the channel switch notification message including a switch count value from the base station (BS) of the second communication system, wherein the switch count value is counted during a specific time from the channel switch notification message reception time to a completion time of the channel switch; and receiving data from the base station (BS) of the second communication system through a channel corresponding to the new channel number based on the switch count value.

The user equipment (UE) may perform counting from the reception time of the channel switch notification message, and may transmit data to the base station (BS) of the second communication system through the channel corresponding to the new channel number from a specific time at which the switch count value is set to zero '0'. The node of the first communication system may be a mobility management entity (MME) or an interworking management entity (IWME). The first communication system and the second communication system may be heterogeneous communication systems. The first communication system may be a cellular communication system; and the second communication system may be a wireless LAN (WLAN) system.

In accordance with another aspect of the present invention, a user equipment (UE) of a first communication system for performing channel switch in a plurality of communication system convergence networks includes: a receiver configured to receive a channel switch command message including a switch time and a new channel number from a base station (BS) of the first communication system; and a transmitter, if the new channel number is supported by the user equipment (UE), configured to transmit a channel switch response message indicating acceptance of the channel switch to the base station (BS) of the first communication system in a response to the channel switch command message, wherein the receiver further receives a channel switch notification message indicating the channel switch from a base station (BS) from a second communication system, and receives data from the base station (BS) of the second communication system through a channel corresponding to the new channel number based on the switch time and the new channel number according to the channel switch notification message.

The transmitter may transmit data to the base station (BS) of the second communication system through a channel corresponding to the new channel number after lapse of the switch time from a reception time of the channel switch notification message. The transmitter may transmit data to the base station (BS) of the first communication system before the switch time elapses from the reception time of the channel switch notification message.

In accordance with another aspect of the present invention, a user equipment (UE) of a first communication system for performing channel switch in a plurality of communication system convergence networks includes: a receiver configured to receive a channel switch command message including a new channel number from a node of the first communication system that manages interworking between the plurality of communication systems, wherein the user equipment which communicates with a base station (BS) of a second communication system through a specific channel; and a transmitter, if the new channel number is supported by the user equipment, configured to transmit a channel switch response message indicating acceptance of the channel switch to a node of the first communication system in a response to the channel switch command message, wherein the receiver is configured to receive a message including an indicator instructing perform data communication with a base station (BS) of the first communication system from the node of the first communication system during a switch time corresponding to a time interval from a channel switch notification message reception time to a channel switch completion time, is configured to receive the channel switch notification message including a switch count value from the base station (BS) of the second communication system, the switch count value being counted during a specific time from the channel switch notification message reception time to a completion time of the channel switch, and is configured to receive data from the base station (BS) of the second communication system through a channel corresponding to the new channel number based on the switch count value.

Advantageous Effects

As is apparent from the above description, exemplary embodiments of the present invention may minimize interference between access points (AP) in a manner that a user can efficiently use the WLAN through control of a cellular network in a broadband wireless communication network, and may control an IME to transmit an indication message to an IP anchor {i.e., flow/IP mapping subject (e.g., P-GW, end-UE, ASN-GW, AP controller) for an inter-RAT movement path of a UE} such as a P-GW on the basis of temp seamless mobility information such that data can be temporarily transmitted to the IP anchor until reaching the switch time. As a result, data interruption does not occur so that communication throughput can be improved.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 1 is a block diagram illustrating a base station (BS) and a user equipment (UE) for use in a wireless communication system.

FIG. 7 exemplarily illustrates Element formats for use in the IEEE 802.11 system.

FIG. 8 exemplarily illustrates Supported Channels elements for use in the IEEE 802.11 system.

FIG. 9A exemplarily illustrates a Measurement Request field format for channel load request, and FIG. 9B exemplarily illustrates a channel load reporting information data field format.

FIG. 10A exemplarily illustrates a Measurement Report field format for channel load request, and FIG. 10B exemplarily illustrates an AP channel report element format.

FIG. 11 exemplarily illustrates a country element format.

FIG. 12 exemplarily illustrates a Channel Switch Announcement element.

FIG. 13A exemplarily illustrates an Extended Channel Switch Announcement element, and FIG. 13B exemplarily illustrates a Supported Operating Classes element.

FIG. 14 exemplarily illustrates a Channel Switch Timing element.

FIGS. 15A and 15B illustrate exemplary Channel Switch Announcement frame action field formats.

FIG. 19A is a conceptual diagram illustrating a frequency channel information request message format.

FIG. 19B is a conceptual diagram illustrating a frequency channel information response message format.

BEST MODE

Figure 2A:
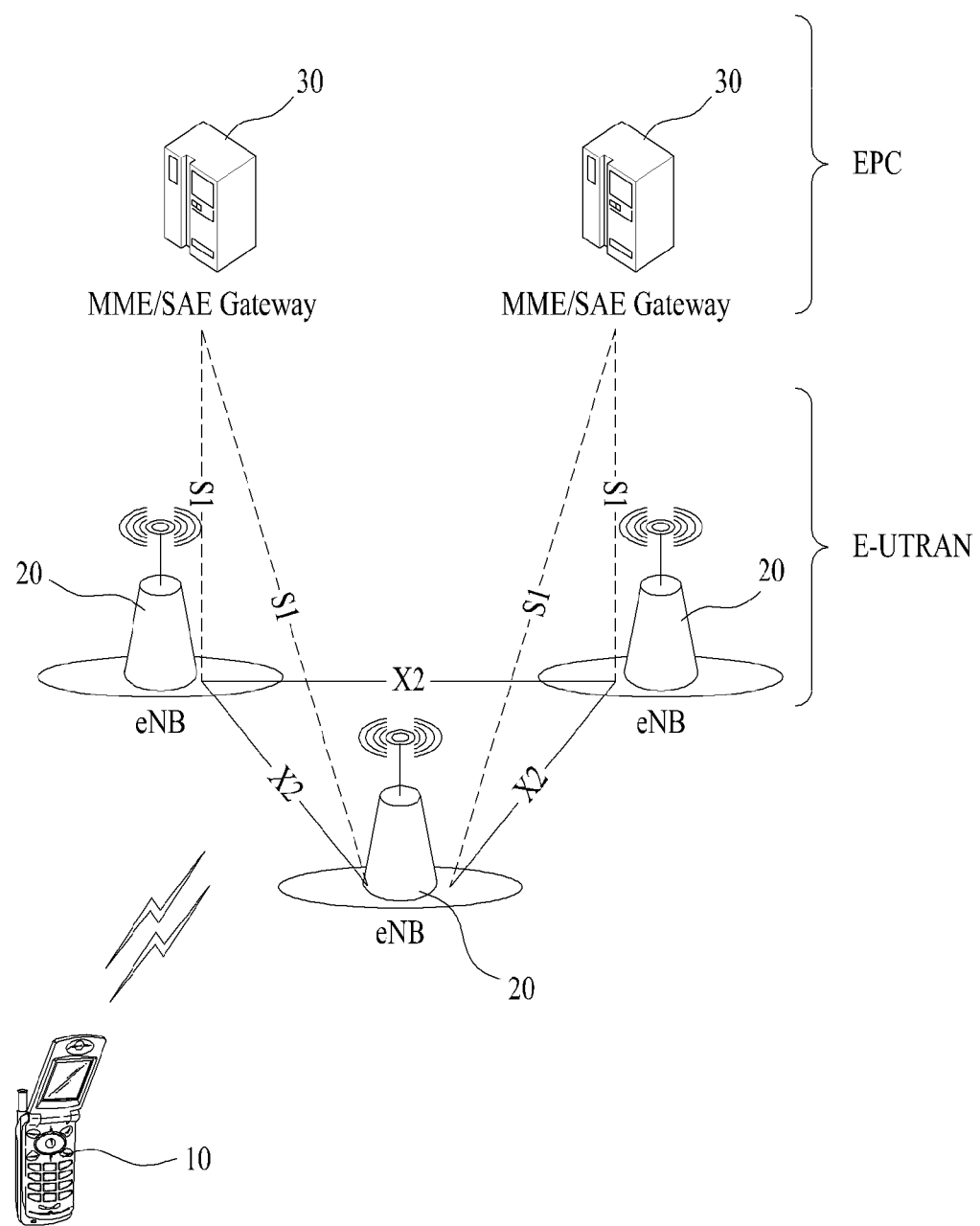
FIG. 2A is a conceptual diagram illustrating an Evolved Universal Mobile Telecommunications System (E-UMTS) network structure.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

FIG. 2*a* is a diagram illustrating a structure of a network of an evolved universal mobile telecommunications system (E-UMTS).

The E-UMTS may also be referred to as an LTE system. The system may be broadly arranged in order to provide various communication services such as voice ALV packet data and in general, may be configured to be enabled based on various technologies that will be described and disclosed in detail with reference to the following diagrams.

Referring to FIG. 2*a*, the E-UMTS network includes an evolved UMTS terrestrial radio access network (E-UTRAN), an evolved packet core (EPC), and one or more UEs 10. The E-UTRAN includes one or more BSs 20. With regard to the EPC, an MME/SAE gateway 30 provides an end point of a session and a mobility control function to the UE 10. The BS 20 and the MME/SAE gateway 30 may be connected through an S1 interface.

The UE 10 may be an apparatus brought by a user and may also be referred to as a mobile station (MS), a user terminal (UT), a subscriber station (SS), or a wireless apparatus.

In general, the BS 20 is a fixed station that communicates with the UE 10. The BS 20 may also be referred to as an access point (AP) as well as a base station. A BS provides end points of a user plane and a control plane to a UE. In general, the BS is configured to include a transmitter and a processor among other components and to be operated according to various technologies stated in the specification.

A plurality of UEs 10 may be positioned in one cell. In general, one BS 20 is arranged in each cell. An interface for transmission of user traffic or control traffic may be used between the BSs 20. In this specification, "downlink" refers to communication to the UE 10 from the BS 20 and "uplink" refers to communication to the BS 20 from the UE 10.

The MME/SAE gateway 30 provides various functions including distribution of paging messages, security control, idle state mobility control, SAR bearer control, and ciphering and integrity protection of non-access stratum (NAS) signaling to the BSs 20. The SAE gateway 30 provides various functions including termination of U-plan packets for paging reasons and switching of U-plan for supporting UE mobility. For convenience of description, the MME/SAE gateway 30 may also be referred to as a "gateway" in the specification. However, this structure may be interpreted as including both an MME gateway and a SAE gateway.

A plurality of nodes may be connected between the BS 20 and the gateway 30 through an S1 interface. The BSs 20 may be connected to each other through an X2 interface and neighbor BSs may have a meshed network structure with an X2 interface.

Figure 2B:
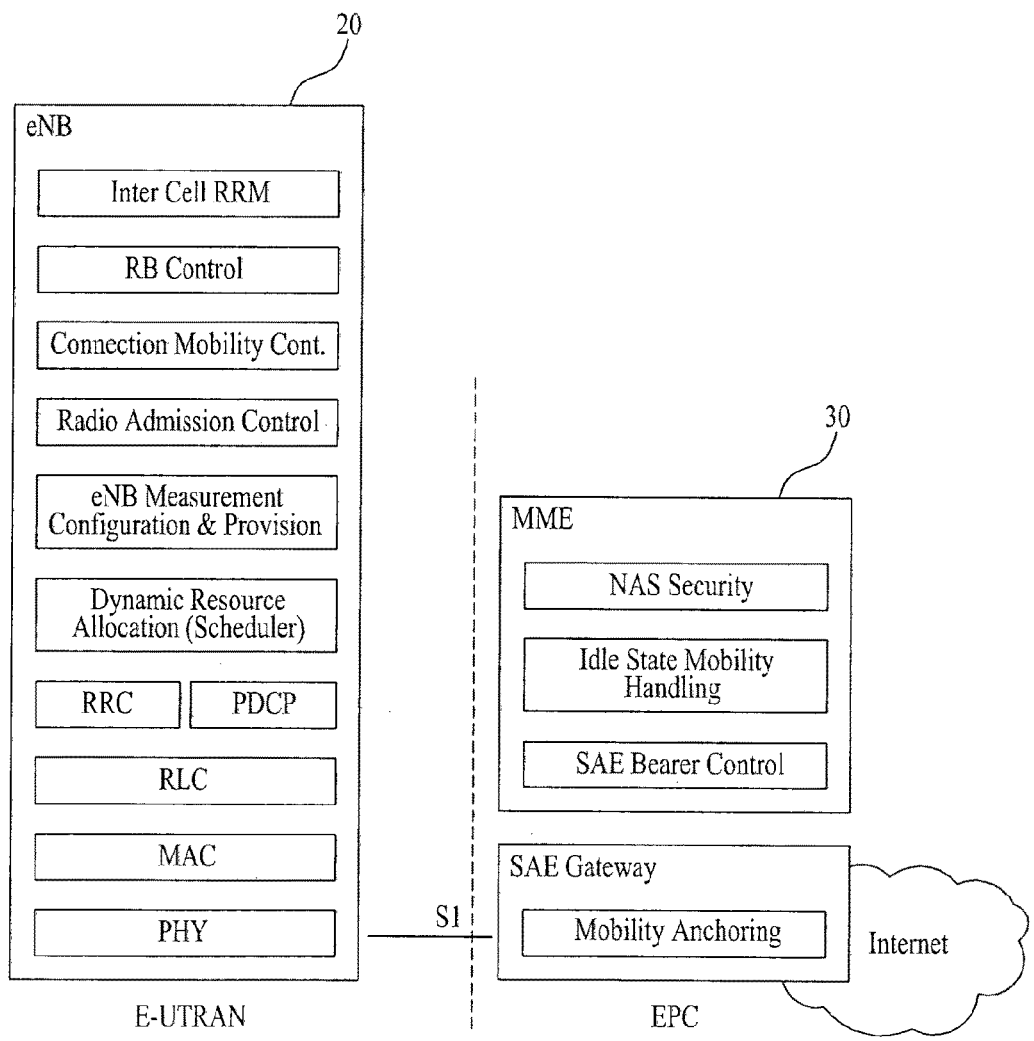
FIG. 2B is a block diagram of a general E-UMTS and a general Evolved Packet Core (EPC).

FIG. 2b is a block diagram illustrating general structures of general E-UTRAN and general EPC.

Referring to FIG. 2b, the BS 20 may perform functions of selection for the gateway 30, routing toward a gateway while radio resource control (RRC) is enabled, scheduling and transmission of paging messages, scheduling and transmission of broadcasting channel (BCCH) information, dynamic allocation of a resource to the UEs 10 in downlink and uplink, configuration and provisioning of BS measurements, wireless bearer control, radio admission control (RAC), and connection mobility control in an LTE_ACTIVE state.

As described above, in the EPC, the gateway 30 may perform functions of paging origination, LTE_IDLE state control, ciphering of a user plane, SAE barer control, and integrity protection of non-access stratum (NAS) signaling.

Figure 2C:
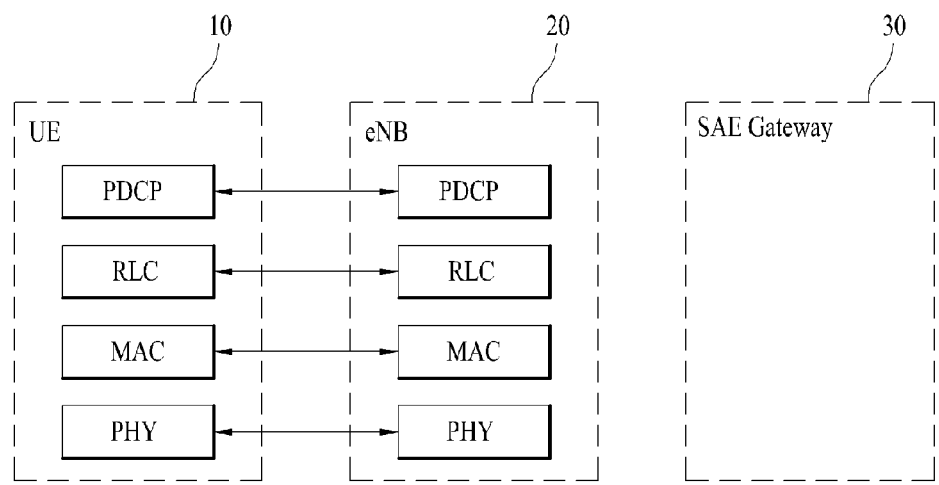
FIGS. 2C and 2D illustrate a user-plane protocol stack and a control-plane protocol stack for an E-UMTS, respectively.
Figure 2D:
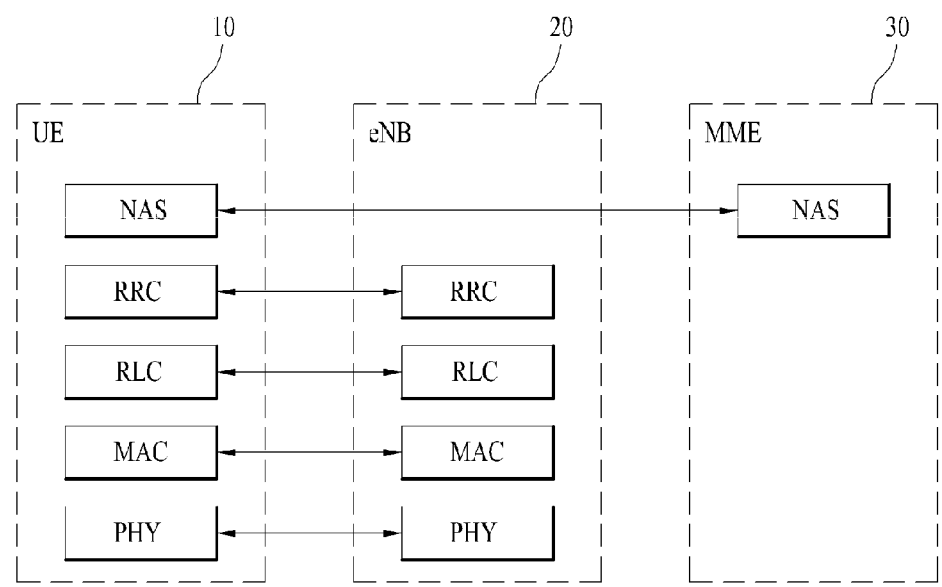

FIGS. 2c and 2d are block diagrams illustrating user plane protocol and control plane protocol stack for an E-UMTS network.

Referring to FIGS. 2c and 2d, protocol layers may be classified into a first layer L1, a second layer L2, and a third layer L3 based on three lower layers of an open system interconnection (OSI) standard model.

The first layer L1 (or a physical layer (PHY)) provides an information transfer service to a higher layer using a physical channel. The PHY is linked to a medium access control (MAC) layer positioned in a higher layer through a transport channel. Data between the MAC layer and the PHY is transmitted through the transport channel. Data between different PHYs, i.e., between PHYs of a transmitter and a receiver (e.g., between PHYs of the UE 10 and the BS 20) is transmitted through a physical channel 21.

The MAC layer of the second layer L2 provides a service to a radio link control (RLC) layer corresponding to a higher layer through a logical channel. The MAC layer of the second layer L2 supports reliable data transmission. The RLC layer illustrated in FIGS. 3B and 3C is illustrated as the RLC layer is not necessary when MAC RLC functions are implemented and are performed in the MAC layer. Referring to FIG. 2c, a packet data convergence protocol (PDCP) layer of the second layer L2 performs a header compression function of reducing unnecessary control information to efficiently transmit an IP packet such as IPv4 or IPv6 in a radio interface having a narrow bandwidth.

Referring to FIG. 2d, an RRC layer of the third layer L3 corresponding to the lowest of three layers is defined only in the control plane. The RRC layer controls logical channels, transport channels and physical channels with respect to configuration, reconfiguration and release of radio bearers (RBs). Here, RBs refers to a service provided by the second layer L2 for data transmission between a UE and an E-UTRAN.

Referring to FIG. 2c, the RLC and MAC layers (which are terminated in the BS 20 in a network) perform functions such as scheduling, automatic repeat request (ARQ), and hybrid automatic repeat request (HARQ). The PDCP layer (which is terminated in the BS 20 in a network) may perform a user plane function such as header compression, integrity protection, and ciphering.

Referring to FIG. 2d, the RLC and MAC layers (which are terminated in the BS 20 in a network) perform the same functions as in a control plane. As exemplified above, the RRC layer (which is terminated in the BS 20 in a network) may perform functions such as broadcasting, paging, RRC connection control, radio bearer (RB) control, mobility function, and UE measurement report and control. A NAS control protocol terminated in the MME gateway 30 in a network may perform a function such as SAE bearer control, authentication, LTE_IDLE mobility handling, paging start in LTE_IDLE, and security control for signaling between gateways and the UE 10.

The NAS control protocol may user three different states: first, LTE_DETACHED state in which there is no RRC entity, second, LTE_IDLE state in which there is no RRC connection but minimum UE information is stored, and third, LTE_ACTIVE state in which RRC connection is established.

The RRC state may be classified into two different states such as RRC_IDLE and RRC_CONNECTED. In the RRC_IDLE state, the UE 10 may receive broadcasting of paging information and system information, specifies discontinuous reception (DRX) configured with NAS, and is allocated with an identifier (ID) for uniquely identifying the UE 10 in a tracking region. In addition, in the RRC_IDLE state, there is no context stored in the BS 20.

In the RRC_IDLE state, the UE 10 specifies a paging DRX cycle. In particular, the UE 10 monitors a paging signal in the case of specific paging of each UE-specific paging DRX cycle.

In the RRC_CONNECTED state, the UE 10 includes E-UTRAN RRC connection and context in the E-UTRAN and transmits and/or receives data to/from an available network (BS). In addition, the UE 10 may report channel quality information and feedback information to the BS 20.

In the RRC_CONNECTED state, the E-UTRAN knows a cell to which the UE 10 belongs. Accordingly, a network may transmit/receive data to/from the UE 10, control mobility (handover) of the UE 10, and perform cell measurement on a neighbor cell.

A detailed description of the IEEE 802.11 system according to the present invention will hereinafter be described with reference to FIGS. 3 to 15.

Figure 3:
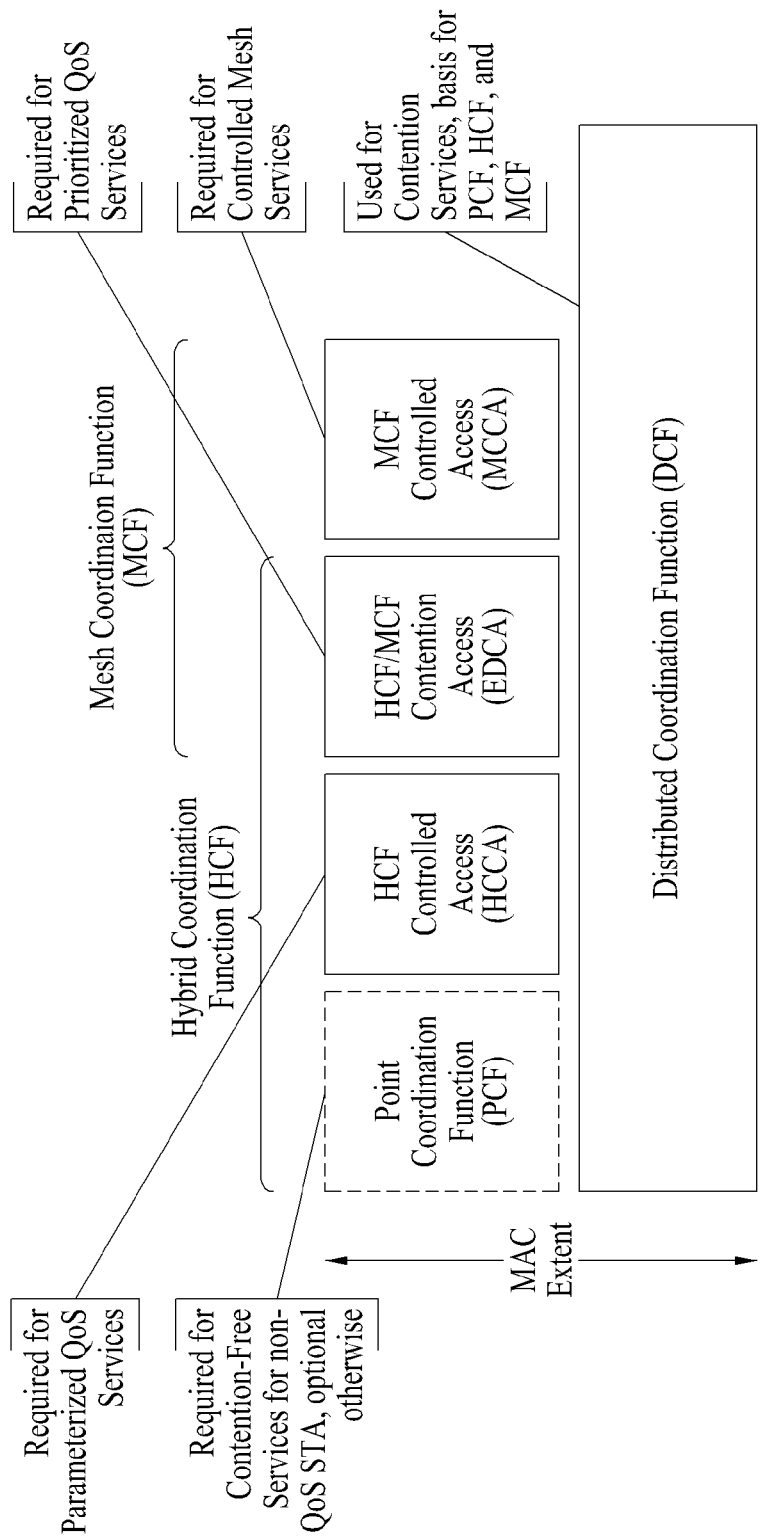
FIG. 3 illustrates an example of MAC architecture for use in an IEEE 802.11 system.

FIG. 3 illustrates an example of MAC architecture for use in an IEEE 802.11 system.

The MAC architecture described in IEEE 802.11 will hereinafter be described with reference to FIG. 3.

TABLE 1

DCF: The fundamental access method of the IEEE 802.11 MAC is a DCF known as carrier sense multiple access with collision avoidance (CSMA/CA). The DCF shall be implemented in all STAs. PCF: The IEEE 802.11 MAC may also incorporate an optional access method called a PCF, which is only usable on infrastructure network configurations. This access method uses a PC, which shall operate at the AP of the BSS, to determine which STA currently has the right to transmit. Hybrid coordination function (HCF): The QoS facility includes an additional coordination function called HCF that is only usable in QoS network configurations. The HCF shall be implemented in all QoS STAs except mesh STAs. HCF controlled channel access (HCCA): The HCCA mechanism uses a QoS-aware centralized coordinator, called a hybrid coordinator (HC), and operates under rules that are different from the PC of the PCF. The HC is collocated with the AP of the BSS and uses the HC's higher priority of access to the WM to initiate frame exchange sequences and to allocate TXOPs to itself and other STAs in order to provide limited-duration CAPs for contention-free transfer of QoS data. The HC traffic delivery and TXOP allocation may be scheduled during the CP(Contention Period) and any locally generated CFP(Contention-Free Period) (generated optionally by the HC) to meet the QoS requirements of a particular TC(Traffic Category) or TS(Traffic Stream). TXOP allocations and contention-free transfers of QoS traffic might be based on the HC's BSS-wide knowledge of the amounts of pending traffic belonging to different TS and/or TCs and are subject to BSS-specific QoS policies. CS mechanism: Physical and virtual CS functions are used to determine the state of the medium. When either function indicates a busy medium, the medium shall be considered busy; otherwise, it shall be considered idle. A physical CS mechanism shall be provided by the PHY. See Clause 7 for how this information is conveyed to the MAC. The details of physical CS are provided in the individual PHY specifications. A virtual CS mechanism shall be provided by the MAC. This mechanism is referred to as the NAV. The NAV maintains a prediction of future traffic on the medium based on duration information that is announced in RTS/CTS frames prior to the actual exchange of data. The duration information is also available in the MAC headers of all frames sent during the CP other than PS-Poll frames. The CS mechanism combines the NAV state and the STA's transmitter status with physical CS to determine the busy/idle state of the medium. The NAV may be thought of as a counter, which counts down to 0 at a uniform rate. When the counter is 0, the virtual CS indication is that the medium is idle; when nonzero, the indication is busy. The medium shall be determined to be busy when the STA is transmitting. MAC-Level Acknowledgements: The reception of some frames, as described in 9.3.2.8 and 9.4.4.5, requires the receiving STA to respond with an acknowledgment if the FCS of the received frame is correct. This technique is known as positive acknowledgment. Lack of reception of an expected frame containing a acknowledgement indicates to the STA initiating the frame exchange that an error has occurred. Note, however, that the destination STA may have received the frame correctly, and that the error may have occurred in the transfer or reception of the frame containing an acknowledgement. When a frame containing an acknowledgement is lost, the MAC that initiated the frame exchange does not receive a protocol indication of whether the initial frame was correctly received.

Figure 4:
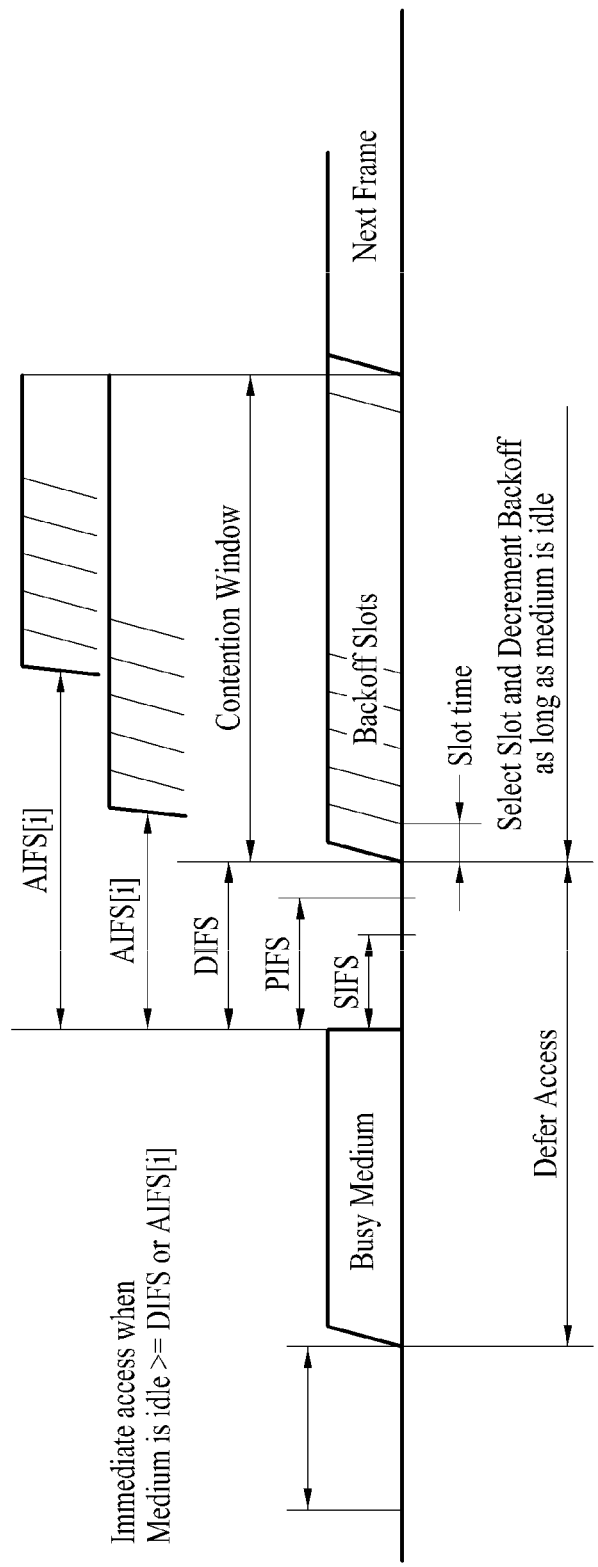
FIG. 4 is a conceptual diagram illustrating the relationship between some IFSs for use in the IEEE 802.11 system.

FIG. 4 is a conceptual diagram illustrating the relationship between some IFSs for use in the IEEE 802.11 system.

FIG. 4 shows the relationship among some IFSs, and a detailed description thereof will hereinafter be described with reference to Table 2.

TABLE 2

IFS: The time interval between frames is called the IFS. A STA shall determine that the medium is idle through the use of the CS function for the interval specified. Six different IFSs are defined to provide priority levels for access to the wireless medium. FIG. 9-3 shows some of these relationships.
The IFSs are: a) RIFS: reduced interframe space, b) SIFS: short interframe space, c) PIFS: PCF interframe space, d) DIFS: DCF interframe space, e) AIFS: arbitration interframe space (used by the QoS facility), f) EIFS: extended interframe space.

Figure 5:
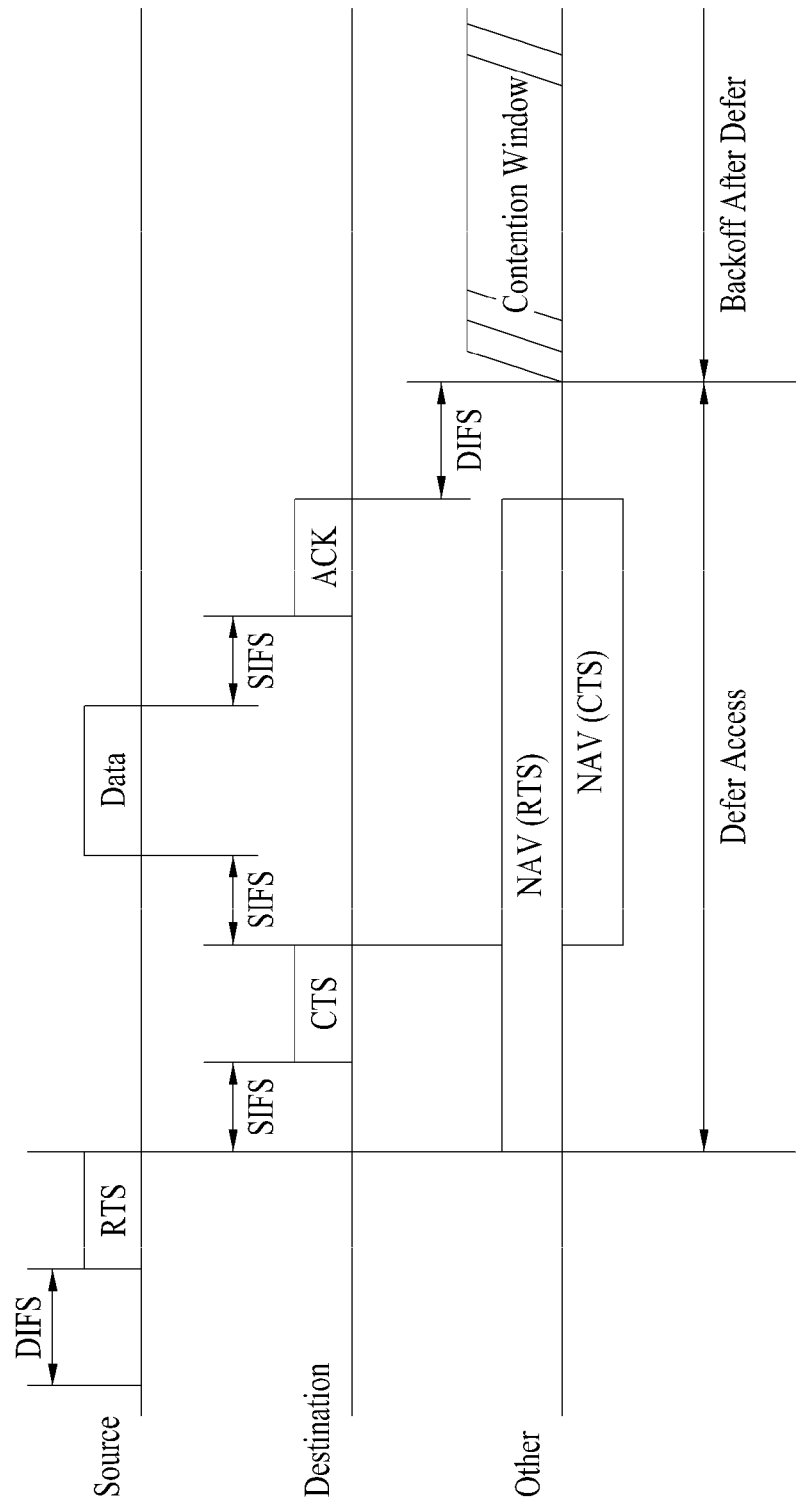
FIG. 5 illustrates RTS/CTS/data/ACK and NAC configuration.
Figure 6:
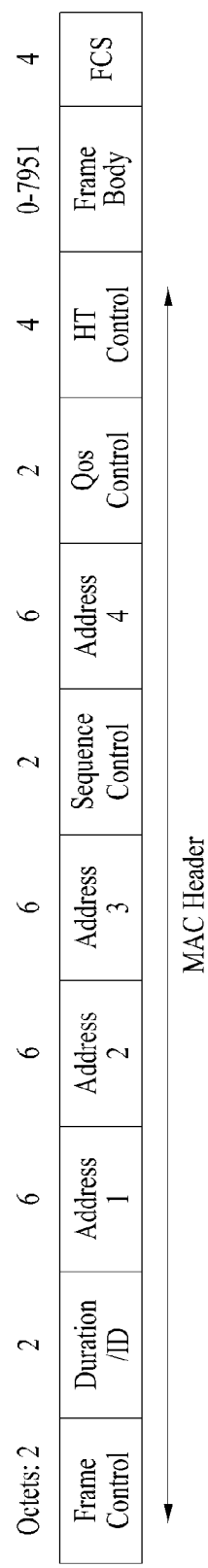
FIG. 6A illustrates MAC frame formats for use in IEEE 802.11 system.
FIG. 6B illustrates Frame Control Field formats for use in the IEEE 802.11 system.

FIG. 5 illustrates RTS/CTS/data/ACK and NAC configuration.

RTS/CTS/data/ACK and NAC configuration shown in FIG. 5 will hereinafter be described with reference to the following Table 3.

TABLE 3

NAV for STAs that may receive the RTS frame, while other STAs may only receive the CTS frame, resulting in the lower NAV bar as shown (with the exception of the STA to which the RTS was addressed).

FIG. 6A illustrates MAC frame formats for use in IEEE 802.11 system, and FIG. 6B illustrates Frame Control Field formats for use in the IEEE 802.11 system.

The MAC format of FIG. 6A and the Frame Control Field formats of FIG. 6B will hereinafter be described with reference to the following Table 4.

TABLE 4

Basic components
Each frame consists of the following basic components: a) A MAC header, which comprises frame control, duration, address, optional sequence control information, optional QoS Control information (QoS data frames only), and optional HT Control fields (+HTC frames only); b) A variable-length frame body, which contains information specific to the frame type and subtype; c) A FCS, which contains an IEEE 32-bit CRC.
Management frame body components
Fields that are not information elements
Max Transmit Power field: The Max Transmit Power field is a twos complement signed integer and is 1 octet in length, providing an upper limit, in units of dBm, on the transmit power as measured at the output of the antenna connector to be used by that AP on the current channel. Operation of the Max Transmit Power field: The maximum tolerance for the value reported in Max Transmit Power field shall be 5 dB. The value of the Max Transmit Power field shall be less than or equal to the Max Regulatory Power value for the current channel. Transmit Power Used field: The Transmit Power Used field is twos complement signed integer and is 1 octet in length. It is less than or equal to the Max Transmit Power and indicates the actual power used as measured at the output of the antenna connector, in units of dBm, by a STA when transmitting the frame containing the Transmit Power Used field. The Transmit Power Used value is determined anytime prior to sending the frame in which it is contained and has a tolerance of ±5 dB. Target Channel: The Target Channel field specifies the channel number of the target channel. The length of the Target Channel field is 1 octet.

FIG. 7 exemplarily illustrates Element formats for use in the IEEE 802.11 system.

A detailed description of the Element formats for use in the IEEE 802.11 system will hereinafter be described with reference to the following Table 7.

TABLE 5

Information elements
Elements are defined to have a common general format consisting of a 1 octet Element ID field, a 1 octet Length field, and a variable-length element-specific Information field. Each element is assigned a unique Element ID as defined in this standard. The Length field specifies the number of octets in the Information field.

The following Table 6 shows Element IDs.

TABLE 6

| Element | Element ID | Length of indicated element (in octets) | Extensible |
|---|---|---|---|
| SSID (see 8.4.2.2) | 0 | 2 to 34 | |
| Power Constraint (see 8.4.2.16) | 32 | 3 | |
| Power Capability (see 8.4.2.17) | 33 | 4 | |
| TPC Request (see 8.4.2.18) | 34 | 2 | |
| TPC Report (see 8.4.2.19) | 35 | 4 | |
| Supported Channels (see 8.4.2.20) | 36 | 4 to 256 | |
| Channel Switch Announcement (see 8.4.2.21) | 37 | 5 | |
| Measurement Request (see 8.4.2.23) | 38 | 5 to 257 | Subelements, for formats using 8.4.2.23.4 to 8.4.2.23.12. |
| Measurement Report (see 8.4.2.24) | 39 | 5 to 257 | Subelements, for formats using 8.4.2.24.4 to 8.4.2.24.11. |
| Quiet (see 8.4.2.25) | 40 | 8 | |
| IBSS DFS (see 8.4.2.26) | 41 | 10 to 255 | |
| AP Channel Report (see 8.4.2.38) | 51 | 3 to 257 | |

TABLE 6-continued

| Element | Element ID | Length of indicated element (in octets) | Extensible |
|---|---|---|---|
| Neighbor Report (see 8.4.2.39) | 52 | 15 to 257 | Subelements |
| Extended Channel Switch Announcement (see 8.4.2.55) | 60 | 6 | |
| Channel Switch Timing (see 8.4.2.66) | 104 | 6 | Yes |

FIG. 8 exemplarily illustrates Supported Channels elements for use in the IEEE 802.11 system.

A detailed description of the Supported Channels elements for use in the IEEE 802.11 system will hereinafter be described with reference to FIG. 8.

TABLE 7

The Supported Channels element contains a list of channel subbands (from those channels defined in 18.3.8.4.3) in which a STA is capable of operating. The format of the Supported Channels element is shown in FIG. 8. The Length field is variable and depends on the number of subbands, defined by a First Channel Number-Number of Channels pair, that are included in the element. The First Channel Number field is set to the first channel (as defined in 18.3.8.4.3) in a subband of supported channels. The Number of Channels field is set to the number of channels in a subband of supported channels. The Supported Channels element is included in Association Request frames, as described in 8.3.3.5; Reassociation Request frames, as described in 8.3.3.7; and Mesh Peering Open frame. Association based on supported channels. A STA shall provide an AP with a list of the channels in which it can operate when associating or reassociating using a Supported Channels element in Association Request frames or Reassociation Request frames. An AP may use the supported channels list for associated STAs as an input into an algorithm used to select a new channel for the BSS. The specification of the algorithm is beyond the scope of this standard.
Selecting and advertising a new channel in an infrastructure BSS: The decision to switch to a new operating channel in an infrastructure BSS shall be made only by the AP. An AP may make use of the information in Supported Channel elements and the results of measurements undertaken by the AP and other STAs in the BSS to assist the selection of the new channel. The algorithm to choose a new channel is beyond the scope of this standard, but shall satisfy applicable regulatory requirements, including uniform spreading rules and channel testing rules. The AP shall attempt to select a new channel that is supported by all associated STAs, although it should be noted that this might not always be possible.

FIG. 9A exemplarily illustrates a Measurement Request field format for channel load request, and FIG. 9B exemplarily illustrates a channel load reporting information data field format.

Channel Load Request shown in FIG. 9 will hereinafter be described with reference to the following Table 8.

TABLE 8

Operating Class indicates the channel set for which the measurement request applies.
Channel Number indicates the channel number for which the measurement request applies.
Randomization Interval specifies the upper bound of the random delay to be used prior to making the measurement, expressed in units of TUs.
The Measurement Duration field is set to the preferred or mandatory duration of the requested measurement, expressed in units of TUs.
The Channel Load Reporting Information subelement indicates the condition for issuing a Channel Load Report. Channel Load Reporting Information subelement data field format is shown in FIG. 9b and contains a 1-octet Reporting Condition subfield and a 1-octet Channel Load Reference Value subfield.
The Reporting Condition is described in Table 8. The Channel Load Reference value.

The following Table 9 illustrates selective subelement IDs for Channel Load Request, and the following Table 10 illustrates the reporting condition for channel load request.

TABLE 9

| Subelement ID | Name | Length field (octets) | Extensible |
|---|---|---|---|
| 0 | Reserved | | |
| 1 | Channel Load Reporting Information | 2 | Yes |
| 2-220 | Reserved | | |
| 221 | Vendor Specific | 1 to 244 | |
| 222-255 | Reserved | | |

TABLE 10

| Condition for report to be issued | Reporting Condition |
|---|---|
| Report to be issued after each measurement (default, used when Channel Load Reporting Information subelement is not included in Channel Load Request). | 0 |
| Report to issued when measured Channel Load is equal to or greater than the reference value. | 1 |
| Report to issued when measured Channel Load in equal to or less than the reference value. | 2 |
| Reserved | 3-255 |

FIG. 10A exemplarily illustrates a Measurement Report field format for channel load request, and FIG. 10B exemplarily illustrates an AP channel report element format.

The Channel Load Report associated with FIG. 10A may be represented by Channel Load=Integer (channel busy time/(MeasurementDuration×1024))×255). AP channel report element format shown in FIG. 10B will hereinafter be described with reference to the following Table 11.

TABLE 11

AP Channel Report element

The AP Channel Report element contains a list of channels where a STA is likely to find an AP. The format of the AP Channel Report element is shown in FIG. 8-214. See 10.11.6 for details.
Operating Class contains an enumerated value from Annex E, specifying the operating class in which the Channel List is valid. An AP Channel Report only reports channels for a single operating class. Multiple AP Channel Report elements are present when reporting channels in more than one operating class. The Channel List contains a variable number of octets, where each octet describes a single channel number. Channel numbering is dependent on Operating Class according to Annex E.
Operating class: Index values indicating Channel starting frequency (GHz), Channel spacing (MHz), and Channel set.

FIG. 11 exemplarily illustrates a country element format.

A detailed description of the country element format shown in FIG. 11 will hereinafter be described with reference to the following Table 12.

TABLE 12

Country element: The Country element contains the information required to allow a STA to identify the regulatory domain in which the STA is located and to configure its PHY for operation in that regulatory domain. The format of this element is as shown in FIG. 11. The Maximum Transmit Power Level field is a signed number and is 1 octet in length. It indicates the maximum power, in dBm, allowed to be transmitted. As the method of measurement for maximum transmit power level differs by regulatory domain, the value in this field is interpreted according to the regulations applicable for the domain identified by the Country String. An operating class is an index into a set of values for radio equipment sets of rules. The Operating Class field is 1 octet in length.

FIG. 12 exemplarily illustrates a Channel Switch Announcement element.

A detailed description of the Channel Switch Announcement element shown in FIG. 12 will hereinafter be described with reference to the following Table 13.

TABLE 13

Channel Switch Announcement element: The Channel Switch Announcement element is used by an AP in a BSS, a STA in an IBSS, or a mesh STA in an MBSS to advertise when it is changing to a new channel and the channel number of the new channel. The format of the Channel Switch Announcement element is shown in FIG. 12. The Channel Switch Mode field indicates any restrictions on transmission until a channel switch. An AP in a BSS or a STA in an IBSS sets the Channel Switch Mode field to either 0 or 1 on transmission. In an MBSS, the Channel Switch Mode Field is reserved. The New Channel Number field is set to the number of the channel to which the STA is moving (as defined in 18.3.8.4.3). For nonmesh STAs, the Channel Switch Count field either is set to the number of TBTTs until the STA sending the Channel Switch Announcement element switches to the new channel or is set to 0. A value of 1 indicates that the switch occurs immediately before the next TBTT. A value of 0 indicates that the switch occurs at any time after the frame containing the element is transmitted. The Channel Switch Announcement element is included in Channel Switch Announcement frames, and may be included in Beacon frames, and Probe Response frames. Selecting and advertising a new channel in an infrastructure BSS: A STA in a BSS that is not the AP shall not transmit the Channel Switch Announcement element. Channel Switch Announcement element operation: A Channel Switch Mode equal to 1 means that the STA in a BSS to which the frame containing the element is addressed shall transmit no further frames within the BSS until the scheduled channel switch. A STA in an IBSS may treat a Channel Switch Mode field equal to 1 as advisory. A Channel Switch Mode equal to 0 does not impose any requirement on the receiving STA.

FIG. 13A exemplarily illustrates an Extended Channel Switch Announcement element, and FIG. 13B exemplarily illustrates a Supported Operating Classes element.

Extended Channel Switch Announcement element of FIG. 13A will hereinafter be described with reference to the following Table 14. Supported Operating Classes element of FIG. 13B will hereinafter be described with reference to the following Table 15.

TABLE 14

Extended Channel Switch Announcement element: The Extended Channel Switch Announcement element is used by an AP in an infrastructure BSS, a STA in an IBSS, or a mesh STA in an MBSS to advertise when the BSS is changing to a new channel or a new channel in a new operating class. The announcement includes both the operating class and the channel number of the new channel. The element is present only when an extended channel switch is pending. The format of the Extended Channel Switch Announcement element is shown in FIG. 13a.

TABLE 15

Operating Class: The Operating Class field specifies the operating class for the channel field included in the same frame. The length of the Operating Class field is 1 octet. Operating classes are defined in Annex E.
Supported Operating Classes element: The Supported Operating Classes element is used by a STA to advertise the operating classes that it is capable of operating with in this country. The value of the Length field of the Supported Operating Classes element is between 2 and 253. The Current Operating Class octet indicates the operating class in use for transmission and reception. The Operating Classes field lists in ascending order all operating classes that the STA is capable of operating with in this country.

FIG. 14 exemplarily illustrates a Channel Switch Timing element.

A detailed description of the Channel Switch Timing element shown in FIG. 14 will hereinafter be described with reference to the following Table 16.

TABLE 16

Channel Switch Timing element: The Channel Switch Timing element contains information regarding the channel switch timing. The Switch Time field is set to the time it takes for a STA sending the Channel Switch Timing element to switch channels, in units of microseconds.

TABLE 16-continued

The Switch Timeout field is set to a time in units of microseconds. The STA sending the Channel Switch Timing element waits for the first data frame exchange on the off-channel for Switch Timeout microseconds before switching back to base channel. The time is

TABLE 16-continued measured from the end of the last symbol of the ACK frame that is transmitted in response to TDLS Channel Switch Response frame, as seen at the air interface.

Spectrum Management Frame Format

FIG. 15A exemplarily illustrates the Channel Switch Announcement frame action field formats.

A detailed description of the Channel Switch Announcement frame action field formats shown in FIG. 15A will hereinafter be described with reference to the following Table 17.

TABLE 17

Channel Switch Announcement frame format: The Channel Switch Announcement frame uses the Action frame body format and is transmitted by an AP in a BSS, a STA in an IBSS, or a mesh STA in an MBSS to advertise a channel switch. The format of the Channel Switch Announcement Action field is shown in FIG. 15a. The Category field is set to 0 (representing spectrum management).
The Spectrum Management Action field is set to 4 (representing a Channel Switch Announcement frame). This element is present when switching to a 40 MHz channel. It may be present when switching to a 20 MHz channel (in which case the secondary channel offset is set to SCN).

Public Action Details

FIG. 15B illustrates exemplary Extended Channel Switch Announcement frame action field formats.

FIG. 15B illustrates Extended Channel Switch Announcement frame action field formats. A detailed description of the Extended Channel Switch Announcement frame action field formats shown in FIG. 15B will hereinafter be described with reference to the following Table 18.

TABLE 18

Extended Channel Switch Announcement frame format: The Extended Channel Switch Announcement frame is transmitted by an AP in an infrastructure BSS, a STA in an IBSS, or a mesh STA in an MBSS to advertise a channel switch. The Category field is set to the value for public action. The Public Action field is set to indicate an Extended Channel Switch Announcement frame. The Channel Switch Mode, New Operating Class, New Channel Number, and Channel Switch Count fields are as described in the Extended Channel Switch Announcement element.

Spectrum Management Action Frames

Five Action frame formats are defined for spectrum management. A Spectrum Management Action field, in the octet field immediately after the Category field, differentiates the five formats.

Table 19 illustrates the spectrum management action field values.

TABLE 19

| Spectrum Mangement Action field value | Description |
| --- | --- |
| 0 | Measurement Request |
| 1 | Measurement Report |
| 2 | TPC Request |
| 3 | TPC Report |
| 4 | Channel Switch Announcement |
| 5-255 | Reserved |

Public Action Frames

The Public Action frame is defined to allow the following:
Inter-BSS and AP to unassociated-STA communications
Intra-BSS communication
GAS A Public Action field, in the octet immediately after the Category field, differentiates the Public Action frame formats. The defined Public Action frames are listed in Table 19.

TABLE 20

| Public Action field value | Description |
| --- | --- |
| 0 | 20/40 BSS Coexistence Management (see 8.5.8.2) |
| 1 | DSE enablement |
| 2 | DSE deenablement |
| 3 | DSE Registered Location Announcement |
| 4 | Extended Channel Switch Announcement |
| 5 | DSE measurement request |
| 6 | DSE measurement report |
| 7 | Measurement Pilot |
| 8 | DSE power constraint |
| 9 | Vendor Specific |
| 10 | GAS Initial Request (see 8.5.8.12) |
| 11 | GAS Initial Response (see 8.5.8.13) |
| 12 | GAS Comeback Request (see 8.5.8.14) |
| 13 | GAS Comeback Response (see 8.5.8.15) |
| 14 | TDLS Discovery Response |
| 15 | Location Track Notification |
| 16-255 | Reserved |

Dynamic Frequency Selection (DFS) will hereinafter be described with reference to the following Table 21.

TABLE 21

Dynamic frequency selection (DFS)

Facilities mandated to satisfy requirements in some regulatory domains for radar detection and uniform channel spreading in the 5 GHz band. These facilities might also be used for other purposes, such as automatic frequency planning.
DFS
Radio regulations might require RLANs operating in the 5 GHz band to implement a mechanism to avoid co-channel operation with radar systems and to provide uniform utilization of available channels. The DFS service is used to satisfy these regulatory requirements.
The DFS service provides for the following:
Association of STAs with an AP in a BSS based on the STAs' supported channels. Quieting the current channel so it can be tested for the presence of radar with less interference from other STAs. Testing channels for radar before using a channel and while operating in a channel. Discontinuing operations after detecting radar in the current channel to avoid interference with radar.
Detecting radar in the current and other channels based on regulatory requirements.
Requesting and reporting of measurements in the current and other channels.

TABLE 21-continued

Dynamic frequency selection (DFS)

Selecting and advertising a new channel to assist the migration of a BSS after radar is detected.
DFS procedures
This subclause describes DFS procedures that can be used to satisfy these and similar future regulatory requirements. The procedures might also satisfy comparable needs in other frequency bands and may be useful for other purposes. STAs shall use the DFS procedures defined in 10.9.1 to 10.9.9 if dot11SpectrumManagementRequired is true. The MIB variable dot11SpectrumManagementRequired shall be set to true when regulatory authorities require DFS. It may also be set to true in other circumstances. The DFS procedures provide for the following:
Associating STAs with an AP in a BSS based on the STAs' supported channels.
Quieting the current channel so it can be tested for the presence of radar with less interference from other STAs
Testing channels for radar before using a channel and while operating in a channel.
Discontinuing operations after detecting radar in the current channel to avoid further interfering with the radar.
Detecting radar in the current and other channels based on regulatory requirements.
Requesting and reporting measurements in the current and other channels.
Selecting and advertising a new channel to assist the migration of a BSS after radar is detected.
Association based on supported channels
A STA shall provide an AP with a list of the channels in which it can operate when associating or reassociating using a Supported Channels element in Association Request frames or Reassociation Request frames.
An AP may use the supported channels list for associated STAs as an input into an algorithm used to select a new channel for the BSS. The specification of the algorithm is beyond the scope of this standard.
An AP may reject an association or reassociation request from a STA if it considers the STA's supported channel list to be unacceptable. For example, a STA's supported channel list might be unacceptable if it can operate only in a limited number of channels. The criteria for accepting or rejecting associations or reassociations are beyond the scope of this standard.
Quieting channels for testing
An AP in a BSS or a mesh STA in an MBSS may schedule quiet intervals by transmitting one or more Quiet elements in Beacon frames and Probe Response frames. The AP or mesh STA may stop scheduling quiet intervals or change the value of the Quiet Period field, the Quiet Duration field, and the Quiet Offset field in Quiet elements as required. Only the most recently received Beacon frame or Probe Response frame defines all future quiet intervals; therefore, all schedules for quiet intervals based on older Beacon frames or Probe Response frames shall be discarded.
Control of the channel is lost at the start of a quiet interval, and the NAV is set by all the STAs in the BSS for the length of the quiet interval. Transmission by any STA in the BSS of any MPDU and any associated acknowledgment within either the primary channel or the secondary channel (if present) of the BSS shall be complete before the start of the quiet interval. If, before starting transmission of an MPDU, there is not enough time remaining to allow the transmission to complete before the quiet interval starts, the STA shall defer the transmission by selecting a random backoff time, using the present CW (without advancing to the next value in the series). The short retry counter and long retry counter for the MSDU or A-MSDU are not affected.
Testing channels for radars
A STA does not transmit in a channel unless the channel has been tested for the presence of radar transmissions according to regulatory requirements.
Discontinuing operations after detecting radars
If a STA is operating in a channel and detects radar operating in the channel or accepts that another STA has detected radar operating in the channel, then the STA discontinues transmissions according to regulatory requirements.
The methods that satisfy regulatory requirements to detect radar transmissions are beyond the scope of this standard.
Selecting and advertising a new channel
An attempt may be made to move a BSS to a new operating channel. It is an objective that disruption to the BSS is minimized in this process, although it should be recognized that a channel switch might not successfully move all STAs. It should also be stressed that the channel switch process is distinct from the regulatory requirement to cease transmission on a particular channel in the presence of radar.
Selecting and advertising a new channel in an infrastructure BSS
The decision to switch to a new operating channel in an infrastructure BSS shall be made only by the AP. An AP may make use of the information in Supported Channel elements and the results of measurements undertaken by the AP and other STAs in the BSS to assist the selection of the new channel. The algorithm to choose a new channel is beyond the scope of this standard, but shall satisfy applicable regulatory requirements, including uniform spreading rules and channel testing rules. The AP shall attempt to select a new channel that is supported by all associated STAs, although it should be noted that this might not always be possible.
An AP shall inform associated STAs that the AP is moving to a new channel and maintain the association by advertising the switch using Channel Switch Announcement elements in Beacon frames, Probe Response frames, and Channel Switch Announcement frames until the intended channel switch time. The AP may force STAs in the BSS to stop transmissions until the channel switch takes place by setting the Channel Switch Mode field in the Channel Switch Announcement element to 1. The channel switch should be scheduled so that all TABLE 21-continued Dynamic frequency selection (DFS)

STAs in the BSS, including STAs in power save mode, have the opportunity to receive at
least one Channel Switch Announcement element before the switch. The AP may send the
Channel Switch Announcement frame in a BSS without performing a backoff, after
determining the WM is idle for one PIFS period.
A STA that receives a Channel Switch Announcement element may choose not to perform
the specified switch, but to take alternative action. For example, it may choose to move to a
different BSS. A STA in a BSS that is not the AP shall not transmit the Channel Switch
Announcement element.ere are multiple, concurrent action requests. The length of the Dialog
Token field is 1 octet.
Channel Switch Announcement element operation
A Channel Switch Mode equal to 1 means that the STA in a BSS to which the frame
containing the element is addressed shall transmit no further frames within the BSS until the
scheduled channel switch. A Channel Switch Mode equal to 0 does not impose any
requirement on the receiving STA.

Extended channel switching (ECS) will hereinafter be described with reference to the following Table 22.

TABLE 22

This subclause describes ECS procedures that change BSS operation in channel
frequency and channel bandwidth.
Advertising supported operating classes
The Operating Classes field shall list all operating classes with which the STA is
capable of operating for the country that is specified in the Country element.
Selecting and advertising a new channel and/or operating class
When an AP with dot11DSERequired true receives frames containing Extended
Channel Switch Announcement elements from the enabling STA, it shall advertise an
extended channel switch with the same channel switch mode, new operating class, new
channel number, and channel switch count as received in the Extended Channel Switch
Announcement elements.
The decision to switch to a new operating channel and/or operating class in an
infrastructure BSS is made by the AP when dot11DSERequired is false. An AP may make
use of the information in the Supported Channels element, Supported Operating Classes
element, and the results of measurements undertaken by the AP and other STAs in the BSS to
assist the selection of the new channel and/or operating class. A method to make the decision
and to select a new channel is defined in 10.9.8.2.
When an AP is switching to a different operating class and
dot11ExtendedChannelSwitchActivated is true, then the AP shall use the Extended Channel
Switch Announcement element and frame. In addition, the AP may also send Channel Switch
Announcement elements and frames when the requirements signified by the new operating
class are met by all associated STAs.
When dot11ExtendedChannelSwitchActivated is true, an AP shall inform associated STAs
that the AP is moving to a new channel and/or operating class and maintain the association
by advertising the switch using Extended Channel Switch Announcement elements in any
transmitted Beacon frames, Probe Response frames, and Extended Channel Switch
Announcement frames until the intended channel switch time. The AP may request STAs in
the BSS to stop transmissions until the channel switch takes place by setting the Extended
Channel Switch Mode field to 1 in the Extended Channel Switch Announcement element. If
possible, the channel switch should be scheduled so that all STAs in the BSS, including
STAs in power save mode, have the opportunity to receive at least one Extended Channel
Switch Announcement element before the switch. The AP may send the Extended Channel
Switch Announcement frame without performing a backoff, after determining the WM is idle
for one PIFS period. When both the Extended Channel Switch Announcement and the
Channel Switch Announcement elements are transmitted in Public Action frames, they shall
be sent in separate frames. A non-AP STA in an infrastructure BSS shall not transmit the
Extended Channel Switch Announcement element.

The above-mentioned description has disclosed detailed content of the IEEE 802.11 system. The detailed description of the IEEE 802.11 can be applied to various embodiments to be proposed by the present invention. Various embodiments of the present invention will hereinafter be described in detail. The legacy inter-RAT technology has been designed on the basis of a request from the user equipment (UE), allows a specific network server to manage WLAN information without interworking between the wireless LAN (WLAN) and the cellular network, and may implement inter-RAT handover upon receiving a UE request. Although the UEs can simultaneously access the multiple RAT (multi-RAT), only the flow mobility/IP—flow mapping at the network level is supported (e.g., MAPCON or IFOM) without control of the radio level, such that simultaneous communication of the UE request can be achieved in the multiple RAT. Due to the above reason, according to the conventional art, a certain control connection between the access point (AP) and the cellular network is not requested, and the control connection is being conducted on the basis of the UE request. However, in order to increase overall network efficiency using the multi RAT, there is a need to provide the tightly-coupled management based on the network, rather than based on the UE request. Since direct control connection between different RATs is established, the inter-RAT interworking can be more efficiently requested at higher speed. In addition, the frequency channel of the AP needs to be controlled by the multiple RAT management entity such that the overall system energy efficiency can be increased or the interference between the APs can be mitigated.

The AP frequency channel for use in the IEEE 802.11 system will hereinafter be described in detail. The AP frequency channel used in the IEEE 802.11 system may be determined on the basis of the supported channel list of connected STAs located below the AP.

1) The STA may transmit its own supported channel list to the AP during (re)association. 2) The AP may select a new channel on the basis of the supported channel list of the received STAs. Alternatively, if it is impossible to accept the STA channel, the (re)association reject message may be transmitted to the STA. 3) The AP may select a new channel using the next parameter. It may be possible to select the channel capable of supporting all associated STAs in the supported channel list of supported channel elements received from the STAs. Alternatively, the channel may be selected on the basis of the measurement result value obtained from the STA or the AP. Alternatively, it may be possible to select the channel according to the presence or absence of the detected radar after completion of radar testing using the quieting channels. 4) If the AP selects a new channel, a Channel Switch Announcement element is contained in a Beacon/Probe Response message, and the Beacon/Probe Response message is then transmitted, so that selection of the new channel can be notified. For example, the Channel Switch Announcement element may include a channel switch mode, a new channel number, a channel switch count. 5) STAs having received the Channel Switch Announcement element may stop transmission until the channel is switched. If the Channel Switch Count of the Channel Switch Announcement element is set to zero (0), the STAs may be switched to a new channel. Each STA which does not desire to switch a new channel may be shifted to a new BSS.

The dynamic frequency selection may be determined by controlling the access point (AP). In addition, during the channel switching, it is impossible for the user equipment (UE) to transmit data. However, if tightly-coupled interworking between the AP and the cellular network is provided, the entity configured to manage interworking may mitigate the inter-AP interference encountered in the AP jamming situation, and the AP configuration may be more efficiently controlled, such that it is expected that the overall system efficiency can be increased.

The present invention can provide the cellular—coordinated AP frequency channel selection scheme under the environment in which the UE can simultaneously access two networks through interworking between the cellular network and the WLAN.

The network structure in which plural communication systems interact or interwork with each other will hereinafter be described in detail.

Figure 16:
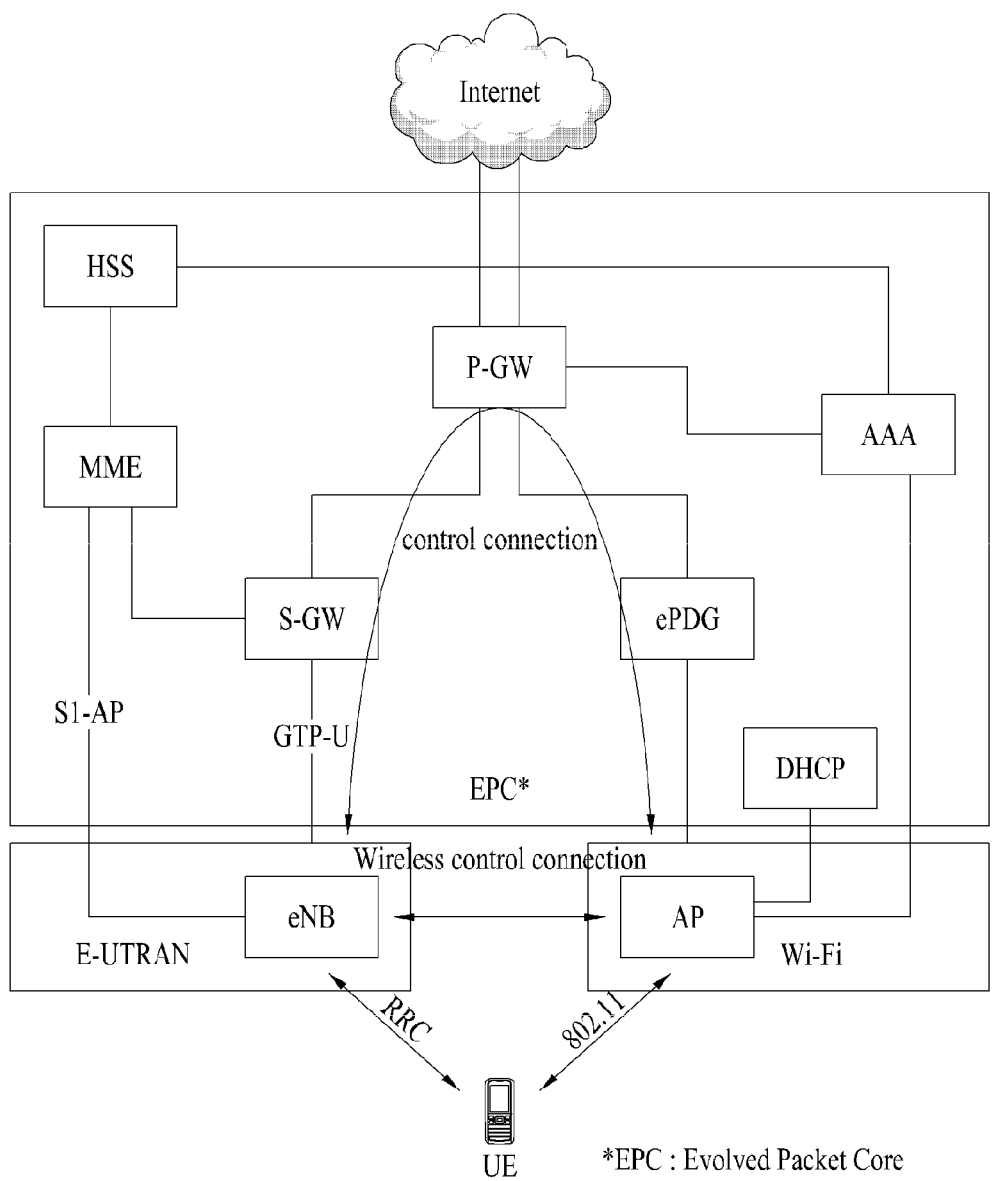
FIG. 16 is a network structure illustrating an interworking structure between a first communication system (e.g., LTE system) and a second communication system (e.g., Wi-Fi system).

FIG. 16 is a network structure illustrating an interworking structure between a first communication system (e.g., LTE system) and a second communication system (e.g., Wi-Fi system).

In the network structure shown in FIG. 16, backhaul control connection may be present between the AP and the eNB through a backbone network (e.g., P-GW or Evolved Packet Core (EPC)), and wireless control connection may be present between the AP and the eNB. For peak throughput and data traffic off-loading, the user equipment (UE) may simultaneously support a first communication system (or a first communication network) configured to use the first wireless communication scheme and a second communication system (or a second communication network) configured to use the second wireless communication scheme through interworking between plural communication networks. In this case, the first communication network may be referred to as a primary network, or the first communication system may be referred to as a primary system. The second communication network may be referred to as a secondary network, or the second communication system may be referred to as a secondary system. For example, the UE may be configured to simultaneously support LTE (or LTE-A) and Wi-Fi (e.g., a near field communication (NFC) system such as WLAN/802.11). For convenience of description and better understanding of the present invention, the user equipment (UE) may be referred to as a multi-system capability UE.

In the network structure shown in FIG. 16, the primary system has a wider coverage, and may be a network for transmitting control information. As an example of the primary system, WiMAX or LTE (LTE-A) system may be used. Meanwhile, the secondary system may have a network having a small coverage, and may be a system for data transmission. The secondary network may be a WLAN system such as Wi-Fi.

The following items are assumed in the present invention.

It is assumed that the entity configured to manage interworking may be present in the cellular network, and the interworking function may be implemented in the following three entities.

e-NB—Reuse Existing Entity
  MME (Mobility Management Entity)—reuse existing entity
  IWME (InterWorking Management Entity)—Define new entity The interworking function may be associated with the interworking associated procedure between the eNB and UE or between the eNB and the AP. The entity configured to manage interworking may store/manage AP information. The eNB/MME/IWME may store/manage information of APs located between the coverage.

It is assumed that the AP of the secondary system (e.g., Wi-Fi) and the eNB acting as the AP of the primary system (e.g., the cellular communication system such as LTE or WiMAX) are connected to each other through a radio link. In the present invention, the AP configured to wirelessly interface with the eNB may be referred to as eAP. That is, the eAP may support not only 802.11 MAC/PHY but also the LTE protocol stack for communication with the eNB or the WiMAX protocol stack. The eAP may act as a UE in association with the eNB, and may communicate with the eNB.

Figure 17:
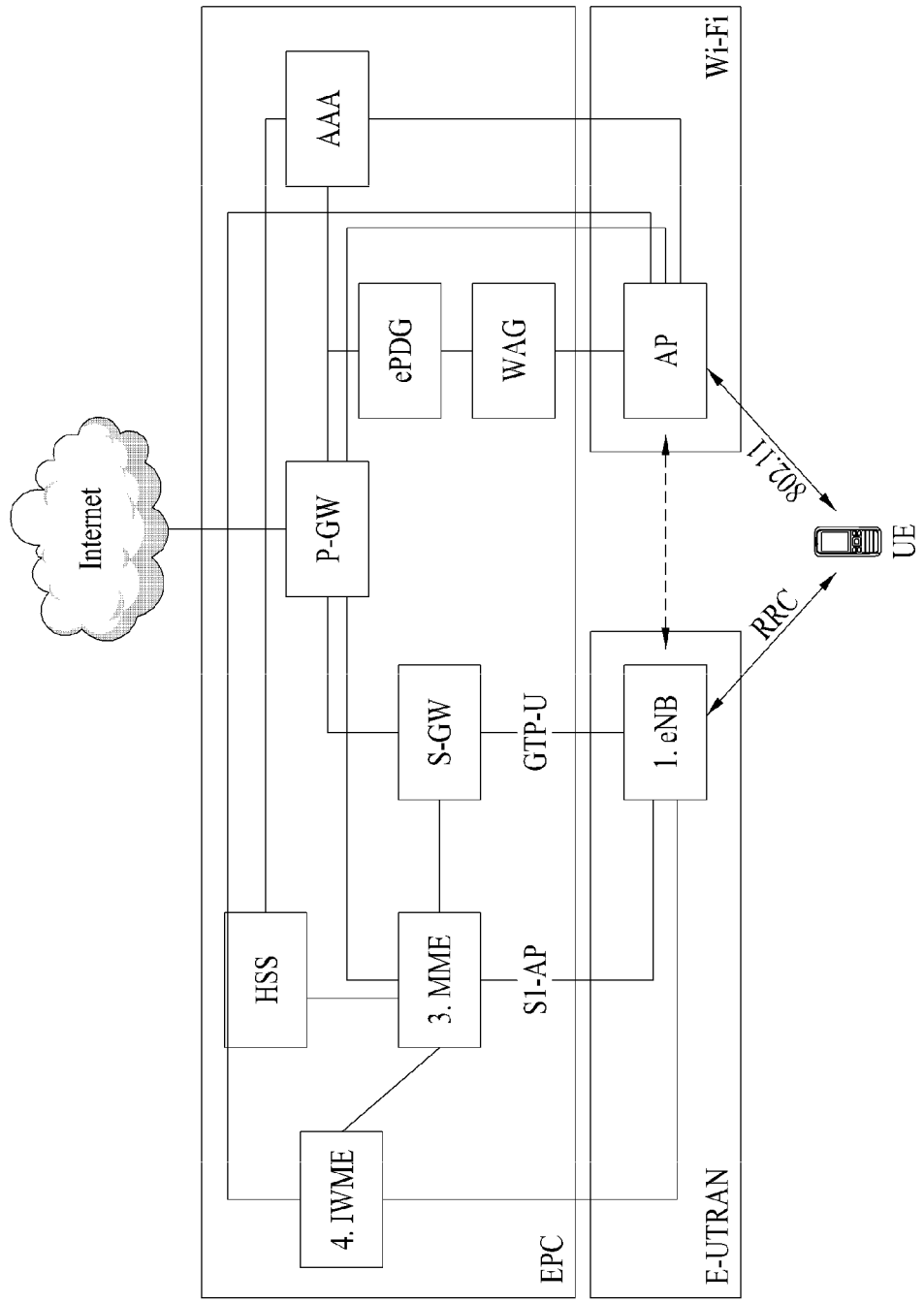
FIG. 17 is a conceptual diagram illustrating an example of WiFi Cellular interworking network structure according to the present invention.

FIG. 17 is a conceptual diagram illustrating an example of Wi-Fi Cellular interworking network structure according to the present invention.

Under the environment in which the UE simultaneously communicate with the Wi-Fi network and the cellular network is present, the cellular network may manage AP information according to the following four methods in a manner that a dual mode UE can more efficiently use the WiFi-cellular convergence network.

Method 1: Use of Air Interface between the eNB and the AP: The eNB may control the AP in a similar way to a general UE using wireless control connection to the AP.

Method 2: Use of backhaul interface between the eNB and the AP: The eNB may control the AP using the wired control connection to the AP.

Method 3: Use of control interface between the MME and the AP: AP may be controlled using control connection between the MME and the AP (i.e., secondary system).

Method 4: Use of control interface between the IWNE and the AP: AP may be controlled using control connection between IWME and AP (i.e., secondary system).

Hereinafter, in case that the AP frequency channel is switched, the present invention may provide the procedure for AP frequency channel switching based on the cellular network so as to maximize the data transmission efficiency of the UE.

Figure 18:
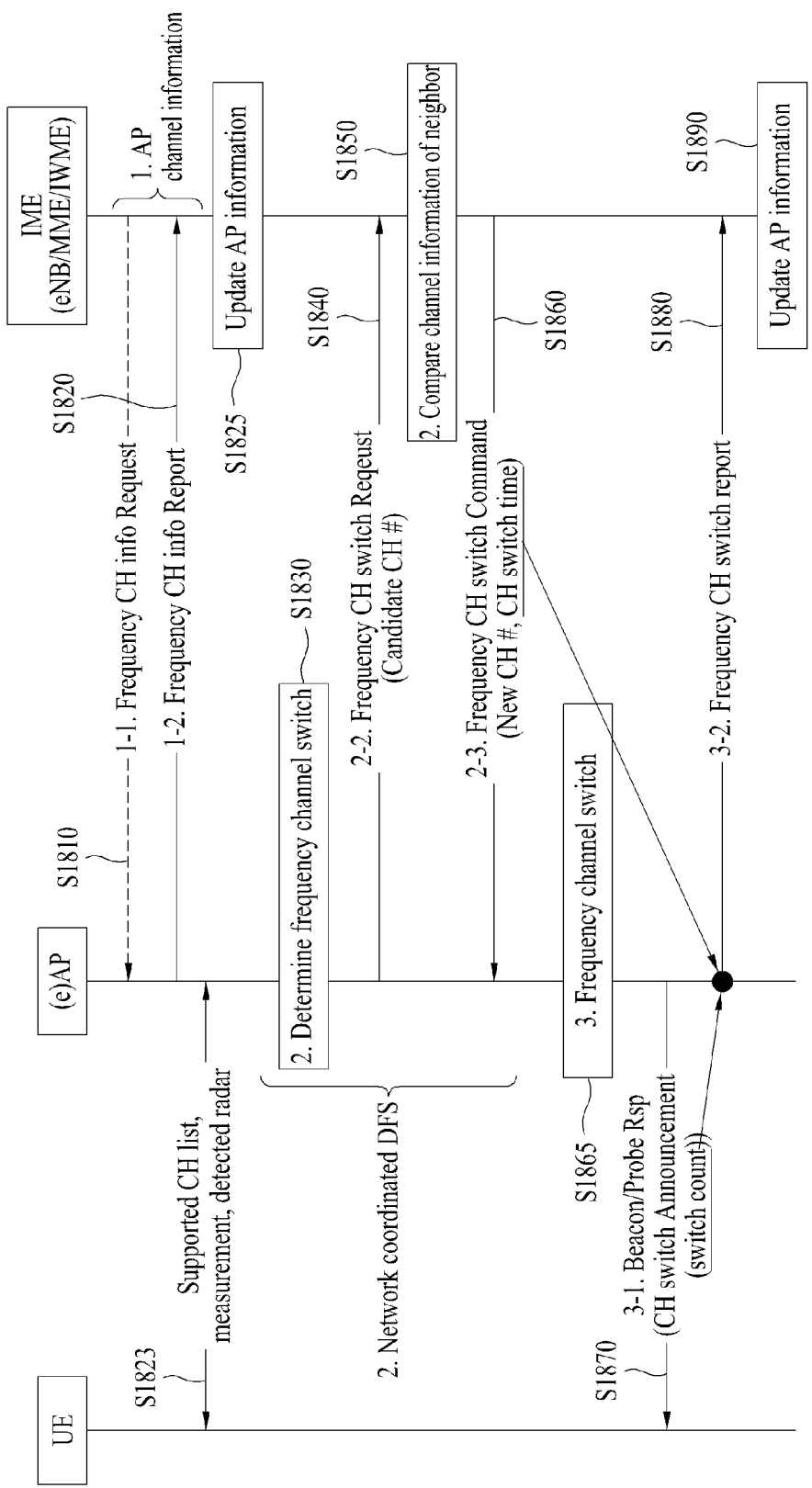
FIG. 18 is a conceptual diagram illustrating an AP frequency channel switching procedure based on the cellular network so as to maximize data transmission efficiency of a UE when a frequency channel of AP is switched.

FIG. 18 is a conceptual diagram illustrating cellular network-based AP frequency channel switching procedure so as to maximize data transmission efficiency of a UE when a frequency channel of AP is switched.

IME (or, eNB, MME, IWME) acting as the interworking entity of the cellular network may transmit a message for requesting frequency channel information from the AP of the WLAN in step S1810. The frequency channel information request message may be a message for requesting only the frequency channel information. Alternatively, the frequency channel information element may be contained in the message requesting AP associated information, such that the frequency channel information may also be requested. The frequency channel information request message may also be transmitted according to the require of interworking entity.

FIG. 19A is a conceptual diagram illustrating a frequency channel information request message format.

Referring to FIG. 19A, the parameter contained in the frequency channel information request message may include at least one of AP BSSID (Basic Service Set IDentifier)/SSID (Service Set IDentifier), a parameter requesting the AP supported frequency channel list of the AP, a parameter requesting a frequency channel number currently used by the AP, a parameter requesting a load status of the currently used channel, a parameter requesting ANPI (Average Noise Power Indicator) or RSNI (Received Signal to Noise Indicator) received from the AP, a reporting configuration parameter, etc. Each request information may be configured in the form of a bitmap, and may indicate that the value of a parameter set to '1' is requested. The length of each field may be only exemplary, and may be assigned different values as necessary.

If the frequency channel information request message is transmitted to the AP, the AP may transmit its own frequency information to the IME through the frequency channel information response message (or the frequency channel information element) in step S1820. The AP may transmit the supported channel list, the measurement, and the detected radar to the UE in step S1823. The frequency channel information response message will hereinafter be described with reference to FIG. 19B.

FIG. 19B is a conceptual diagram illustrating a format of frequency channel information response message.

Referring to FIG. 19B, if the frequency channel request message is received, the frequency channel response message may be transmitted by the AP. Alternatively, if the AP frequency channel associated information is changed differently from FIG. 18, the AP may also transmit this situation to the IME according to the unsolicited scheme. In case of a response to the request message/element, only the value regarding the requested parameter may also be transmitted. The above-mentioned information may be transmitted in the form of a frequency channel information element of each frequency channel information response message or the AP information transmission message.

Referring to FIG. 19B, the frequency channel information response message may include at least one of the AP BSSID/SSID parameter, the frequency channel list parameter supported by the AP, a frequency channel number parameter currently used by the AP, a load status parameter of a currently used channel, and an interference signal value (ANPI (Average Noise Power Indicator) or RSNI (Received Signal to Noise Indicator)) received from the peripheral AP. In case of a response to the request, the value regarding the parameter '1' contained in the request message may be transmitted only. However, the length of each field is only exemplary, and may be assigned different values. The IME may update AP information on the basis of the frequency channel information response message received from the AP in step S1825.

Decision of AP Frequency Channel Switching

The frequency channel of AP according to the present invention may command the AP or the IME to be switched to another frequency channel.

1. Case Decided by AP

If the supported channels of UE located in BSS, the measurement resultant value, or another signal is detected (if serious interference occurs), it may be determined that the frequency channel will be changed to another to increase the channel performance.

2. Case Decided by IME

In order to maximize performance of APs (in order to minimize interference between the APs, or in order to maximize transmission throughput) on the basis of not only the AP frequency channels received from the APs but also information associated with the AP frequency channels, changing the frequency channel of a specific AP may be determined.

If it is determined that the frequency is changed to another channel as described above, the interworking with IME so as to select a new optimum frequency channel is proposed by the present invention.

Case in which AP Determines Frequency Channel Switching (S1830)

If the AP decided to switch the frequency channel in step S1830, the frequency channel switch request message/element including the following field (or parameter) may be transmitted to the IME in step S1840. The frequency channel switching request message/element may include at least one of SSID/BSSID field of the AP, a switch cause field indicating the switch cause (e.g., high data load (for offloading), high interference, low signal strength, etc.), a field indicating a current channel number (e.g., a current frequency channel number or index), a field indicating a candidate frequency channel number list, and a 'value for switch cause' field (e.g., data load, interference, signal strength, etc. caused by the switch).

The IME having received the frequency channel switch request message/element from the AP may compare the received information with peripheral AP information stored in the IME, may select an optimum frequency channel in step S1850, and may transmit associated information to the AP through the frequency channel switch command message/element, etc. in step S1860. The frequency channel switch command message/element may include at least one of the AP SSID/BSSID, a current frequency channel number, a selected frequency channel number (or index), a channel switch time, etc. In this case, the switch time may be denoted by a time interval from a start time (i.e., a transmission time of the beacon/probe response message including the channel switch announcement) at which a notification message for channel changing occurs to the channel switching completion time (at which the switch count of the channel switch announcement (CSA) message is set to zero '0'), or may also be denoted by a value indicating a channel switching completion time.

The AP having received the frequency channel switch command message/element from the IME may perform the DFS procedure defined in the legacy 802.11 system. The AP may perform frequency channel switching based on the frequency channel switch command message/element in step S1865, and may transmit the beacon/probe response message including the channel switch notification element to the UE in step S1870. The switch count value transmitted from the beacon/probe response message may be established by referring to the channel switch time transmitted from the IME. For example, the switch count may be set to zero after lapse of a specific time corresponding to the channel switching time originated from the beacon/probe response message reception time. The UE having received the beacon/probe response message may be switched to a new channel at a specific time at which the switch count defined in the corresponding element is set to zero '0', and may stop message transmission until reaching the switch time (during the switch time or until reaching a specific time at which the switch count is set to zero).

The AP may transmit the beacon/probe response message including the channel switch notification element. If the frequency channel switch is well performed, the frequency CH switch report message is transmitted to the IME, such that the corrected frequency channel information can be transmitted in step S1880. The IME having received the corresponding message including the corrected frequency channel information may update the AP information on the basis of the received information in step S1890.

Meanwhile, assuming that the multi-RAT UE communicating with the corresponding AP does not support the frequency channel newly selected in step S1850, this situation is previously notified to the UE before reaching the switch time, such that the UE may select a new AP or may perform seamless mobility over the cellular network.

Case in which IME Decides the Switching

Differently from the case in which the AP decides the frequency channel switch in step S1830, if IME determines such switching, steps S1840 and S1850 may be omitted as necessary. The IME may perform comparison between peripheral AP information stored in the server of the IME, may select an optimum frequency channel, and may transmit associated information to the AP through the frequency channel switch command message/message, etc. in step S1860. The frequency channel switch command message/message may include at least one of the AP SSID/BSSID, a current frequency channel number, a selected frequency channel number (or index), and a switch time. Assuming that the multi RAT UE communicating with the corresponding AP does not support the newly selected frequency channel, this situation is pre-notified to the UE before reaching the switch time, and the UE may select a new AP or may perform seamless mobility over the cellular network. Likewise, in this case, the switch time may be denoted by a time interval from a start time (i.e., a transmission time of the beacon/probe response message including the channel switch announcement) at which a notification message for channel changing occurs to the channel switching completion time (at which the switch count of the CSA message is set to zero '0'), or may also be denoted by a value indicating a channel switching completion time.

Figure 20:
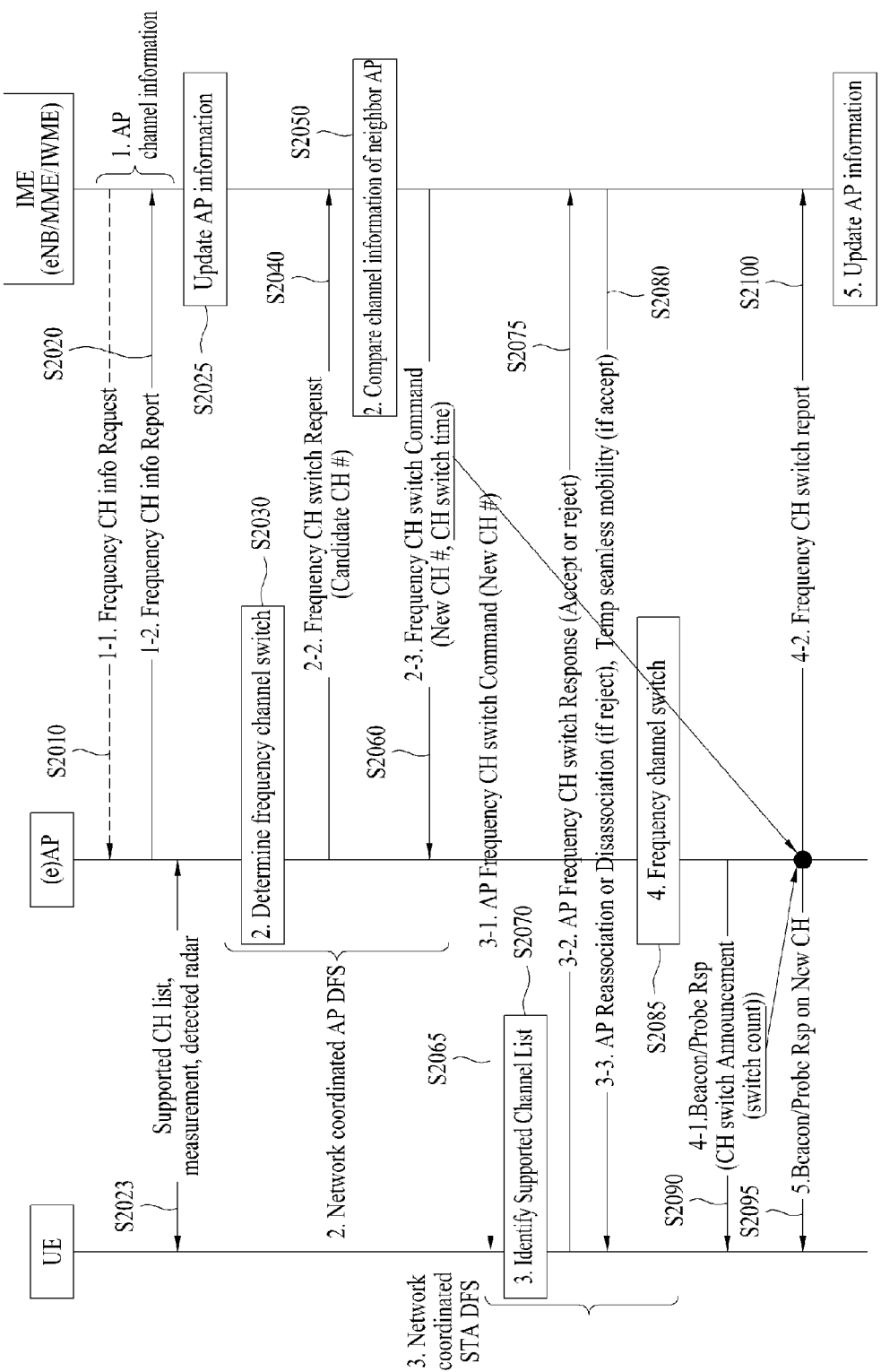
FIG. 20 is a conceptual diagram illustrating one example of a STA (station) dynamic frequency switch with Wi-Fi data disconnection or without Wi-Fi data disconnection.

FIG. 20 is a conceptual diagram illustrating one example of a STA dynamic frequency switch with Wi-Fi data disconnection or without Wi-Fi data disconnection.

Referring to FIG. 20, steps (S2010 to S2060) may be similar to steps (S1810 to S1860) of FIG. 18, and as such a detailed description will herein be omitted. The contents of steps S1810 to S1860 of FIG. 18 may also be applied to FIG. 20.

In case of the dynamic frequency channel selection of the IEEE 802.11 system, if the AP (or e(AP)) determines the channel switching, the AP may inform the UEs of the channel switch completion time, such that data transmission to the AP is stopped. In FIG. 18, before the AP performs channel switching, the AP may request the most appropriate channel from the IME, and the IME may command the AP having requested the channel switching on the basis of the peripheral AP information stored in the IME to select the appropriate channel, such that the most appropriate channel can be notified. In addition, the IME having recognized the channel switching of the AP may inform the AP of the optimum channel, and at the same time may inform the UE that the current serving AP channel of the dual mode UE will be changed through the cellular network. If the UE does not support a new channel. Before receiving the channel disconnection message from the AP, data being transmitted/received to/from the AP may be switched to the cellular network.

Method for Transmitting AP Frequency Channel Switch Command Message

IME may transmit the AP frequency channel switch command message including a new frequency channel number to the multi-RAT UE(s) communicating with the corresponding AP in step S2065. In this case, the UE having received the corresponding AP frequency channel switch command message may identify the supported channel list of the UE in step S2070, and may transmit the AP frequency channel switch response message (e.g., AP frequency CH switch response message) for indicating acceptance or rejection of the identified result to the IME in step S2075. That is, assuming that a new frequency channel number contained in the AP frequency channel switch command message is present in the UE supported channel list, the AP frequency channel switch response message for indicating acceptance of the channel switch may be transmitted. In contrast, assuming that the new frequency channel number contained in the AP frequency channel switch command message is not contained in the UE supported channel list, the AP frequency channel switch response message for indicating rejection of the channel switch may be transmitted.

If the AP frequency channel switch response message indicates the UE acceptance state of the channel switch in step S2075, the UE may temporarily transmit data during a predetermined time from the acceptance time to the switch time (or during the switch time). In addition, execution or non-execution of the temporary cellular network switching procedure may be determined by defining the indication message in the AP frequency channel switch command message or the AP frequency channel switch response message, and this situation may be transmitted by IME or UE, such that the resultant operation can be performed in step S2080. However, as shown in FIG. 20, the IME may inform the UE of the frequency channel switch command message, and it may be desirable that IP/flow mapping be updated to P-GW.

The present invention may control an IME to transmit an indication message to an IP anchor {i.e., flow/IP mapping subject (e.g., P-GW, end-UE, ASN-GW, AP controller, etc.) for an inter-RAT movement path of a UE} such as a P-GW on the basis of temp seamless mobility information such that data can be temporarily transmitted to the IP anchor during the switch time, such that data interruption does not occur. In this case, the switch time may be a duration time from a beacon transmission start time at which the AP indicates the channel switching to the switch completion time (i.e., the switch count in 802.11), and may be a time interval defined as both a disconnection time of data connection to the AP and a re-association action time.

If the AP frequency channel switch response message indicates rejection of the channel switch, UE data transmission may be achieved through the cellular network (i.e., AP disassociation) or may also be achieved by AP re-association.

Meanwhile, the IME may inform only the UE not supporting the new channel of the switching state to a new channel on the basis of the UE information stored in IME, instead of the multi-RAT UE communicating with the corresponding AP in step S2065. If the UE does not support the new channel, data switching (i.e., AP disassociation) to the cellular network may be notified, or connection to the new AP (i.e., AP re-association) may be indicated. In this case, when the data switching indication or the AP movement indication message is transmitted, the "cause" field may be added, and the unsupportable channel may be explicitly designated in step S2080. In this case, in the case of using the UE that can support the new channel and wait for switching to the new channel, information indicating that data transmitted/received to/from the AP until reaching the switch time (or during the switch time) is temporarily switched may be implicitly used. In addition, execution or non-execution of the temporary cellular network switching procedure may be determined by defining the indication field in the multi RAT capability negotiation message, and this situation may be transmitted by IME or UE, such that the corresponding operation can be carried out. However, generally, the IME may inform the UE of the corresponding result, or it may be desirable that IP/flow mapping to P-GW be updated.

Thereafter, the AP may switch the frequency channel in step S2085, and the AP may transmit the beacon response message or the probe response message to inform the UE of the channel switching state in step S2090. In this case, the beacon response message or the probe response message may include the switch count field associated with the frequency switch. The UE may determine a specific time at which the switch count is set to zero to be the channel switch completion time. The AP may transmit the beacon response message or the probe response message to the UE through a new frequency channel switched to the UE in step S2095. The AP may transmit the frequency channel switch report to the IME in step S2100. Thereafter, the IME may update the Ap information on the basis of the frequency channel switch report received from the AP.

Figure 21:
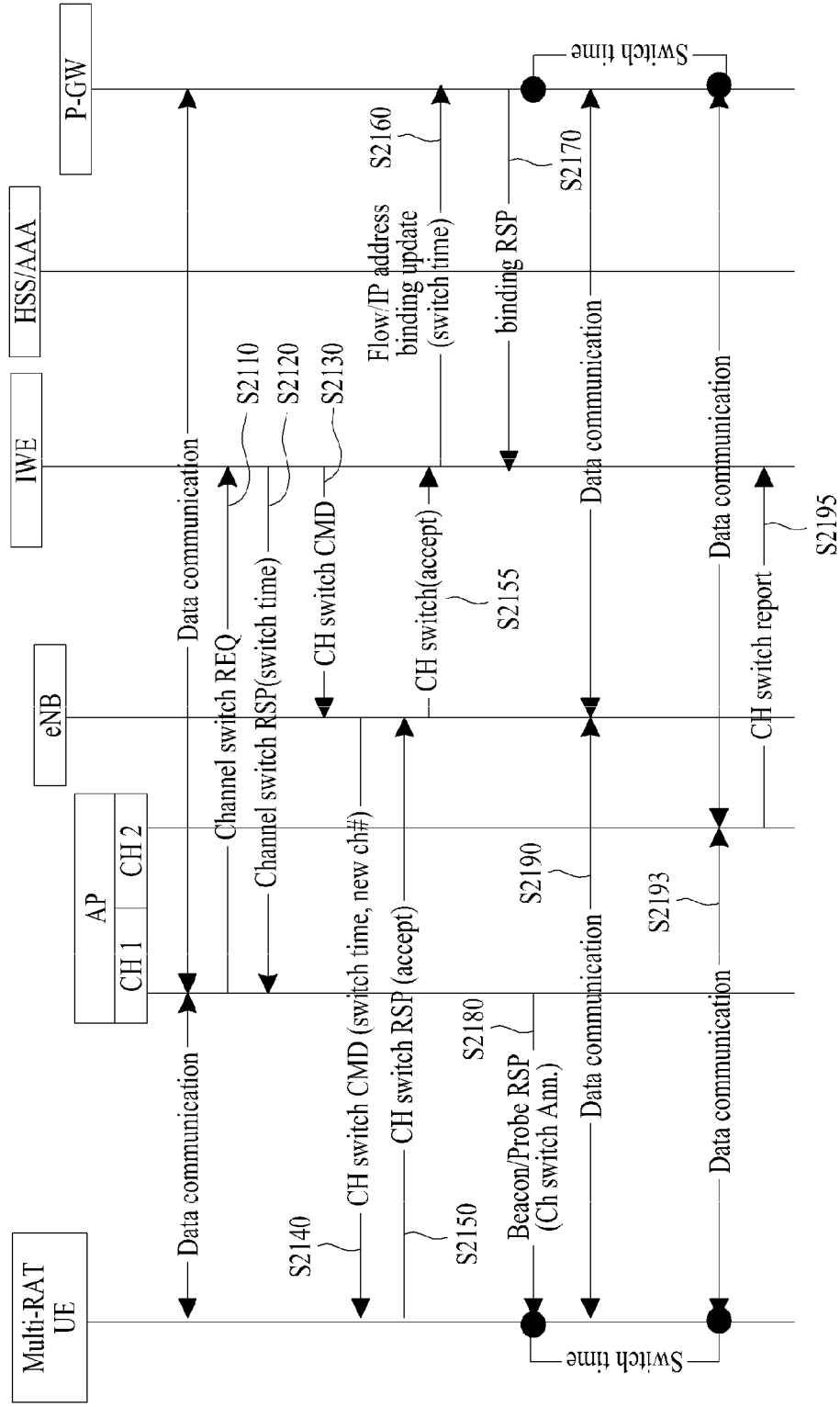
FIG. 21 is a conceptual diagram illustrating another example of a STA (station) dynamic frequency switch with Wi-Fi data disconnection or without WiFi data disconnection.

FIG. 21 is a conceptual diagram illustrating another example of a STA dynamic frequency switch with Wi-Fi data disconnection or without WiFi data disconnection.

Although not shown in FIG. 21, steps S1810 to S1830 of FIG. 18 may be additionally applied to the present invention.

Referring to FIG. 21, while the multi-RAT UE may communicate with the AP of the Wi-Fi network through a specific frequency channel (CH 1), the IME (or eNB, MME, IWME) acting as the interworking entity of the cellular network may transmit the frequency channel switch request message to the AP in step S2110. As a response to the frequency channel switch request, the IME may transmit the channel switch response message including the switch time to the AP in step S2120. In addition, the IME may transmit the channel switch command message including the switch time to the eNB in step S2130. Thereafter, the AP may transmit the channel switch command message to the UE. In this case, the channel switch command message may include a switch time and information regarding the new channel number (CH 2) in step S2140.

As a response to the channel switch command message, the UE may transmit the channel switch response message to the BS in step S2150. This channel switch response message may include an indication message indicating that the channel switch command is accepted when the UE supports the frequency channel corresponding to the new channel number (CH 2) contained in the channel switch command message. As a result, the BS may transmit the channel switch response message including acceptance of the channel switch command received from the UE to the IME in step S2155. The IME may transmit the flow/IP address bind update message including the switch time information to the P-GW in step S2160, and may receive the binding response message from the P-GW in step S2170.

The AP may transmit the beacon/probe response message including an indication message indicating the channel switching to the UE in step S2180. In step S2190, the UE may temporarily communicate with the BS during a predetermined time from the beacon/probe response message reception time to the elapse time of the switch time having been received in step S2140. After expiration of the switch time, the multi-RAT uE may communicate with the AP through the new switched frequency channel (CH 2) in step S2193. The AP may report the report message indicating the channel switching to the IME in step S2195. In this case, the switch time may be a duration time from a beacon transmission start time at which the AP indicates the channel switching to the switch completion time (i.e., the switch count in 802.11), and may be a time interval defined as both a disconnection time of data connection to the AP and a re-association action time.

The present invention may control the IME to transmit an indication message to an IP anchor {i.e., flow/IP mapping subject (e.g., P-GW, end-UE, ASN-GW, AP controller, etc.) for an inter-RAT movement path of a UE} such as a P-GW on the basis of temp seamless mobility information such that data can be temporarily transmitted to the IP anchor during the switch time, such that data interruption does not occur, resulting in improvement of communication throughput.

Exemplary embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all changes within the equivalent scope of the invention are within the scope of the invention.

The invention claimed is:

1. A method for performing channel switch by a user equipment (UE) of a first communication system, the method comprising:
   receiving data from an access point (AP) of a wireless LAN (WLAN) through a channel of the AP;
   receiving, a first message including a channel switch time and a new channel number of the AP, from a base station of a cellular communication system;
   if the new channel number is supported by the user equipment supports, transmitting a second message indicating acceptance of the channel switch to the base station of the cellular communication system in a response to the first message;
   receiving a third message notifying the channel switch from the AP; and
   after receiving the third message, transmitting data to the base station of the cellular communication system until the channel switch time; and
   transmitting data to the AP through a new channel corresponding to the new channel number after the channel switch time.

2. The method according to claim 1, wherein the channel switch is determined by the AP or the cellular communication system.

3. The method according to claim 1, wherein the first message comprises a channel switch command message.

4. The method according to claim 1, wherein the second message comprises a channel switch response message.

5. A user equipment (UE) of a cellular communication system for performing channel switch, the UE comprising:
   a receiver that:
      receives data from an access point (AP) of a wireless LAN (WLAN) through a channel of the AP;
      receives, a first message including a channel switch time and a new channel number of the AP, from a base station of the cellular communication system; and
   a transmitter that:
      if the new channel number is supported by the user equipment, transmits a second message indicating acceptance of the channel switch to the base station (BS) of the cellular communication system in a response to the first message,
   wherein the receiver further:
      receives a third message notifying the channel switch from the AP, and
   wherein the transmitter further:
      after the third message is received, transmits data to the base station of the cellular communication system until the channel switch time; and
      transmits data to the AP through a new channel corresponding to the new channel number after the channel switch time.

* * * * *